(12) United States Patent
Ogawa et al.

(10) Patent No.: US 9,715,051 B2
(45) Date of Patent: Jul. 25, 2017

(54) LIQUID CRYSTAL DISPLAY DEVICE

(71) Applicant: DIC CORPORATION, Tokyo (JP)

(72) Inventors: Shinji Ogawa, Kita-adachi-gun (JP);
Yoshinori Iwashita, Kita-adachi-gun (JP); Seiji Funakura, Kamisu (JP);
Katsunori Shimada, Sakura (JP)

(73) Assignee: DIC CORPORATION, Tokyo (JP)

(*) Notice: Subject to any disclaimer, the term of this patent is extended or adjusted under 35 U.S.C. 154(b) by 0 days.

(21) Appl. No.: 14/115,305

(22) PCT Filed: Sep. 20, 2012

(86) PCT No.: PCT/JP2012/074062
§ 371 (c)(1),
(2) Date: Nov. 1, 2013

(87) PCT Pub. No.: WO2014/045371
PCT Pub. Date: Mar. 27, 2014

(65) Prior Publication Data
US 2015/0268395 A1    Sep. 24, 2015

(51) Int. Cl.
*C09K 19/30* (2006.01)
*G02B 5/22* (2006.01)
(Continued)

(52) U.S. Cl.
CPC .......... *G02B 5/223* (2013.01); *C09K 19/3003* (2013.01); *C09K 19/44* (2013.01);
(Continued)

(58) Field of Classification Search
CPC ................................................ G02F 1/134363
See application file for complete search history.

(56) References Cited

U.S. PATENT DOCUMENTS

| 7,763,401 | B2 | 7/2010 | Araki | |
|---|---|---|---|---|
| 2003/0151708 | A1* | 8/2003 | Funakura | G02B 5/223 349/106 |
| 2012/0229744 | A1* | 9/2012 | Hattori | C08F 2/50 349/124 |

FOREIGN PATENT DOCUMENTS

| JP | 2000-19321 A | 1/2000 |
|---|---|---|
| JP | 2000-192040 A | 7/2000 |

(Continued)

OTHER PUBLICATIONS

International Search Report dated Nov. 13, 2012, issued in corresponding application No. PCT/JP2012/074062.

*Primary Examiner* — Chanceity Robinson
(74) *Attorney, Agent, or Firm* — Westerman, Hattori, Daniels & Adrian, LLP

(57) ABSTRACT

There is provided a liquid crystal display device in which a decrease in the voltage holding ratio (VHR) of a liquid crystal layer and an increase in the ion density (ID) are prevented and problems of display defects such as white streaks, alignment unevenness, and image sticking are overcome. In the liquid crystal display device, a decrease in the voltage holding ratio (VHR) of a liquid crystal layer and an increase in the ion density (ID) are prevented and display defects such as image sticking are suppressed. Therefore, the liquid crystal display device is useful for active matrix liquid crystal display apparatuses that use a VA mode or a PSVA mode and can be applied to liquid crystal display apparatuses of liquid crystal televisions, monitors, cellular phones, smart phones, and the like.

15 Claims, 1 Drawing Sheet

(51) Int. Cl.
*C09K 19/44* (2006.01)
*G02F 1/1335* (2006.01)
*C09K 19/12* (2006.01)
*C09K 19/52* (2006.01)

(52) U.S. Cl.
CPC .. *G02F 1/133514* (2013.01); *C09K 2019/123* (2013.01); *C09K 2019/301* (2013.01); *C09K 2019/3004* (2013.01); *C09K 2019/3009* (2013.01); *C09K 2019/3013* (2013.01); *C09K 2019/3016* (2013.01); *C09K 2019/3027* (2013.01); *C09K 2019/521* (2013.01); *C09K 2019/523* (2013.01)

(56) References Cited

FOREIGN PATENT DOCUMENTS

| | | |
|---|---|---|
| JP | 2002-309255 A | 10/2002 |
| JP | 2006-317602 A | 11/2006 |
| JP | 2009-109542 A | 5/2009 |
| JP | 2010-189560 A | 9/2010 |
| JP | 2011-141356 A | 7/2011 |
| TW | 200813624 A | 3/2008 |
| TW | 201031735 A1 | 9/2010 |
| TW | 201142502 A1 | 12/2011 |
| TW | 201239071 A1 | 10/2012 |
| WO | 2010/095506 A1 | 8/2010 |
| WO | 2011/092973 A1 | 8/2011 |

\* cited by examiner

LIQUID CRYSTAL DISPLAY DEVICE

TECHNICAL FIELD

The present invention relates to a liquid crystal display device.

BACKGROUND ART

Liquid crystal display devices have been used for clocks, calculators, household electric appliances, measuring instruments, panels for automobiles, word processors, electronic organizers, printers, computers, televisions, etc. Typical examples of a liquid crystal display mode include a TN (twisted nematic) mode, an STN (super twisted nematic) mode, a DS (dynamic scattering) mode, a GH (guest-host) mode, an IPS (in-plane switching) mode, an OCB (optically compensated birefringence) mode, an ECB (electrically controlled birefringence) mode, a VA (vertical alignment) mode, a CSH (color super-homeotropic) mode, and FLC (ferroelectric liquid crystal). The driving method has been changed from conventional static driving to multiplex driving, and passive matrix driving and, recently, active matrix driving performed using TFTs (thin film transistors) and TFDs (thin film diodes) have become the predominantly used driving method.

As shown in FIG. 1, typical color liquid crystal display devices include two substrates (1) each having an alignment film (4), a transparent electrode layer (3a) serving as a common electrode and a color filter layer (2) disposed between one of the substrates and its alignment film, and a pixel electrode layer (3b) disposed between the other of the substrates and its alignment film. The substrates are disposed so that the alignment films face each other, and a liquid crystal layer (5) is sandwiched between the substrates.

The color filter layer includes a black matrix and a color filter constituted by a red colored layer (R), a green colored layer (G), a blue colored layer (B), and optionally a yellow colored layer (Y).

A liquid crystal material constituting the liquid crystal layer has been highly controlled in terms of impurities because impurities left in the liquid crystal material considerably affect the electrical characteristics of a display apparatus. It has been also known that, regarding a material of the alignment film, the alignment film directly contacts the liquid crystal layer and therefore impurities left in the alignment film moves to the liquid crystal layer, which affects the electrical characteristics of the liquid crystal layer. Thus, the characteristics of liquid crystal display devices resulting from impurities in the material of the alignment film are being studied.

Similarly to the alignment film material, a material such as an organic pigment used for the color filter layer is also assumed to affect the liquid crystal layer because of impurities contained therein. However, it has been considered that, since there are an alignment film and a transparent electrode between the color filter layer and the liquid crystal layer, the direct influence of impurities on the liquid crystal layer is much smaller than the influence of impurities contained in the alignment film material. However, in general, the alignment film has a thickness of merely 0.1 μm or less, and even a common electrode which serves as a transparent electrode and is used on the color filter layer side and whose thickness is increased to increase the electrical conductivity has a thickness of merely 0.5 μm or less. Therefore, the color filter layer and the liquid crystal layer are not present in an environment in which they are completely isolated. The color filter layer may cause display defects such as white streaks, alignment unevenness, and image sticking because the voltage holding ratio (VHR) of the liquid crystal layer is decreased and the ion density (ID) is increased due to impurities contained in the color filter layer, the impurities affecting the liquid crystal layer through the alignment film and transparent electrode. To overcome the display defects caused by impurities contained in a pigment constituting the color filter, the following methods have been studied: a method for controlling the elution of impurities that move into liquid crystal by using a pigment in which the proportion of an extract resulting from ethyl formate is adjusted to a particular value or less (PTL 1) and a method for controlling the elution of impurities that move into liquid crystal by specifying a pigment in a blue colored layer (PTL 2). However, these methods are not so different from a method in which the amount of impurities in a pigment is simply decreased. In a current situation in which a purification technique of pigments has advanced, these methods do not provide a sufficient improvement to overcome the display defects.

On the other hand, focusing on the relationship between a liquid crystal composition and organic impurities contained in a color filter, there are disclosed a method in which the difficulty of dissolving the organic impurities in the liquid crystal layer is expressed as a hydrophobic parameter of liquid crystal molecules in the liquid crystal layer, and the hydrophobic parameter is set to be equal to or more than a particular value; and a method in which, with consideration of a correlation between the hydrophobic parameter and an —$OCF_3$ group at the liquid crystal molecule terminal, a liquid crystal composition containing, at a certain proportion or more, a liquid crystal compound having an —$OCF_3$ group at the liquid crystal molecule terminal is prepared (PTL 3).

However, in the disclosure of PTL 3, the essence of the invention is also to suppress the influence of impurities in a pigment on the liquid crystal layer. The direct relationship between a structure of a liquid crystal material and a structure of a coloring material such as a dye/pigment used for a color filter has not been studied, which does not overcome the problems of display defects of highly advanced liquid crystal display devices.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

SUMMARY OF INVENTION

Technical Problem

The present invention provides a liquid crystal display device in which a decrease in the voltage holding ratio (VHR) of a liquid crystal layer and an increase in the ion density (ID) are prevented and problems of display defects such as white streaks, alignment unevenness, and image sticking are overcome by using a particular liquid crystal composition and a color filter that uses a particular dye and/or pigment.

Solution to Problem

To solve the above problems, the inventors of the present invention have conducted thorough studies on the combination between a coloring material such as a dye/pigment constituting the color filter and a structure of a liquid crystal material constituting the liquid crystal layer. As a result, the inventors have found that, in a liquid crystal display device including a particular liquid crystal material structure and a color filter that uses a dye and/or pigment having a particular structure, a decrease in the voltage holding ratio (VHR) of a liquid crystal layer and an increase in the ion density (ID) are prevented and problems of display defects such as white streaks, alignment unevenness, and image sticking are overcome. Thus, the present invention has been completed.

The present invention provides a liquid crystal display device including a first substrate, a second substrate, a liquid crystal composition layer sandwiched between the first substrate and the second substrate, a color filter constituted by a black matrix and at least RGB three color pixel portions, a pixel electrode, and a common electrode, wherein the liquid crystal composition layer is composed of a liquid crystal composition containing 30% to 50% of a compound represented by general formula (I)

[Chem. 1]

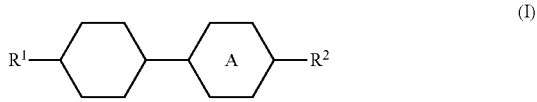

(I)

(in the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and A represents a 1,4-phenylene group or a trans-1,4-cyclohexylene group), 5% to 20% of a compound represented by general formula (II-1)

[Chem. 2]

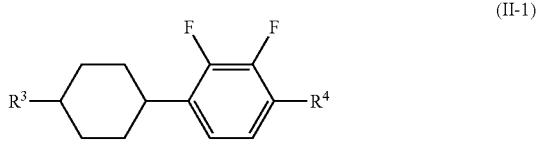

(II-1)

(in the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms), and 25% to 45% of a compound represented by general formula (II-2)

[Chem. 3]

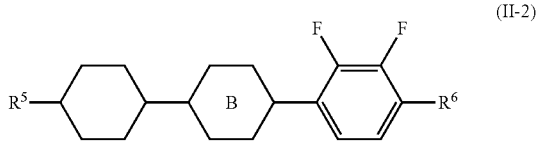

(II-2)

(in the formula, $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; and B represents a 1,4-phenylene group or a trans-1,4-cyclohexylene group that may be substituted with fluorine), and
the RGB three color pixel portions contain, as coloring materials, a diketopyrrolopyrrole pigment and/or an anionic red organic dye in an R pixel portion, at least one selected from the group consisting of a halogenated copper phthalocyanine pigment, a phthalocyanine-based green dye, and a mixture of a phthalocyanine-based blue dye and an azo-based yellow organic dye in a G pixel portion, and an ∈-type copper phthalocyanine pigment and/or a cationic blue organic dye in a B pixel portion.

Advantageous Effects of Invention

According to the liquid crystal display device of the present invention, a decrease in the voltage holding ratio (VHR) of a liquid crystal layer and an increase in the ion density (ID) can be prevented and display defects such as white streaks, alignment unevenness, and image sticking can be prevented by using a particular liquid crystal composition and a color filter that uses a particular dye and/or pigment.

DESCRIPTION OF EMBODIMENTS

FIG. 2 shows an example of a liquid crystal display device of the present invention. First and second substrates (1) each have an alignment film (4). A transparent electrode layer (3a) serving as a common electrode and a color filter layer (2a) containing a particular dye and/or pigment are disposed between one of the substrates and its alignment film. A pixel electrode layer (3b) is disposed between the other of the substrates and its alignment film. The substrates are disposed so that the alignment films face each other. A liquid crystal layer (5a) containing a particular liquid crystal composition is sandwiched between the substrates.

The two substrates in the display device are laminated with a sealing material disposed in a peripheral region. In many cases, a particulate spacer or a columnar spacer composed of a resin and formed by photolithography is disposed between the substrates to keep the distance between the substrates.

(Liquid Crystal Layer)

The liquid crystal layer in the liquid crystal display device of the present invention is composed of a liquid crystal composition containing 30% to 50% of a compound represented by general formula (I)

[Chem. 4]

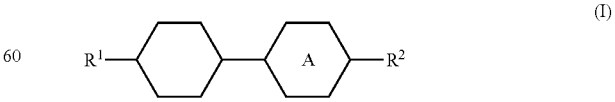

(I)

(in the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and A represents a 1,4-phenylene group or a trans- 1,4-cyclohexylene group), 5% to 20% of a compound represented by general formula (II-1)

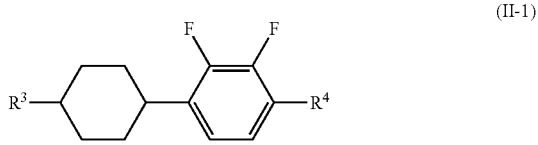

(in the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms), and 25% to 45% of a compound represented by general formula (II-2)

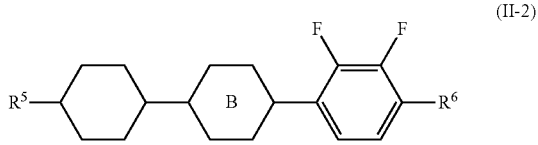

(in the formula, $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; and B represents a 1,4-phenylene group or a trans-1,4-cyclohexylene group that may be substituted with fluorine).

The liquid crystal layer in the liquid crystal display device of the present invention contains 30% to 50% of the compound represented by general formula (I), preferably 35% to 45% of the compound, and more preferably 38% to 42% of the compound.

In general formula (I), $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms;
preferably an alkyl group having 1 to 5 carbon atoms, an alkenyl group having 2 to 5 carbon atoms, an alkoxy group having 1 to 5 carbon atoms, or an alkenyloxy group having 2 to 5 carbon atoms;
more preferably an alkyl group having 2 to 5 carbon atoms, an alkenyl group having 2 to 4 carbon atoms, an alkoxy group having 1 to 4 carbon atoms, or an alkenyloxy group having 2 to 4 carbon atoms; and
$R^1$ preferably represents an alkyl group and, in this case, particularly preferably an alkyl group having 1, 3, or 5 carbon atoms.

$R^1$ and $R^2$ may be the same or different, but are preferably different. When both $R^1$ and $R^2$ represent an alkyl group, $R^1$ and $R^2$ are particularly preferably different alkyl groups having 1, 3, or 5 carbon atoms.

The content of a compound represented by general formula (I) in which at least one substituent of $R^1$ and $R^2$ represents an alkyl group having 3 to 5 carbon atoms is preferably 50% or more, more preferably 70% or more, and further preferably 80% or more relative to the compound represented by general formula (I). Furthermore, the content of a compound represented by general formula (I) in which at least one substituent of $R^1$ and $R^2$ represents an alkyl group having 3 carbon atoms is preferably 50% or more, more preferably 70% or more, further preferably 80% or more, and most preferably 100% relative to the compound represented by general formula (I).

A represents a 1,4-phenylene group or a trans-1,4-cyclohexylene group and preferably a trans-1,4-cyclohexylene group. The content of a compound represented by general formula (I) in which A represents a trans-1,4-cyclohexylene group is preferably 50% or more, more preferably 70% or more, and further preferably 80% or more relative to the compound represented by general formula (I).

Specifically, the compound represented by general formula (I) is preferably compounds represented by general formula (Ia) to general formula (Ik) below.

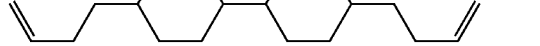
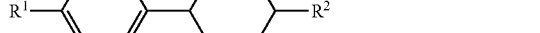
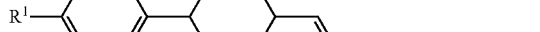
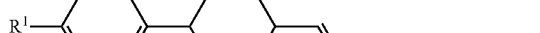

(In the formulae, $R^1$ and $R^2$ each independently represent an alkyl group having 1 to 5 carbon atoms or an alkoxy group having 1 to 5 carbon atoms, but the same embodiment as in $R^1$ and $R^2$ of general formula (I) is preferred.)

Among general formula (Ia) to general formula (Ik), general formula (Ia), general formula (Ib), and general formula (Ig) are preferably employed; general formula (Ia) and general formula (Ig) are more preferably employed; and general formula (Ia) is particularly preferably employed. When importance is given to response speed, general formula (Ib) is also preferably employed. When higher importance is given to response speed, general formula (Ib), general formula (Ie), general formula (If), and general formula (Ih) are preferably employed. Dialkenyl compounds represented by general formula (Ie) and general formula (If) are preferably employed when particularly high importance is given to response speed.

In this regard, the content of the compounds represented by general formula (Ia) and general formula (Ig) is preferably 50% or more, more preferably 70% or more, further preferably 80% or more, and most preferably 100% relative to the compound represented by general formula (I). Furthermore, the content of the compound represented by general formula (Ia) is preferably 50% or more, more preferably 70% or more, and further preferably 80% or more relative to the compound represented by general formula (I).

The liquid crystal layer in the liquid crystal display device of the present invention contains 5% to 20% of the compound represented by general formula (II-1), preferably 10% to 15% of the compound, and more preferably 12% to 14% of the compound.

In general formula (II-1), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, further preferably an alkyl group having 3 to 5 carbon atoms or an alkenyl group having 2 carbon atoms, and particularly preferably an alkyl group having 3 carbon atoms.

$R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, preferably an alkyl group having 1 to 5 carbon atoms or an alkoxy group having 1 to 5 carbon atoms, more preferably an alkyl group having 1 to 3 carbon atoms or an alkoxy group having 1 to 3 carbon atoms, further preferably an alkyl group having 3 carbon atoms or an alkoxy group having 2 carbon atoms, and particularly preferably an alkoxy group having 2 carbon atoms.

Specifically, the compound represented by general formula (II-1) is preferably compounds represented by general formula (II-1a) and general formula (II-1b) below.

[Chem. 8]

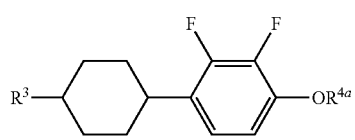

(II-1a)

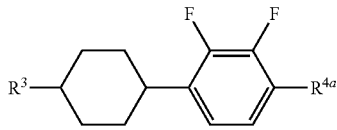

(II-1b)

(In the formulae, $R^3$ represents an alkyl group having 1 to 5 carbon atoms or an alkenyl group having 2 to 5 carbon atoms, and $R^{4a}$ represents an alkyl group having 1 to 5 carbon atoms.)

In general formula (II-1a), the same embodiment as in general formula (II-1) is preferably employed for $R^3$. $R^{4a}$ preferably represents an alkyl group having 1 to 3 carbon atoms, more preferably an alkyl group having 1 or 2 carbon atoms, and particularly preferably an alkyl group having 2 carbon atoms.

In general formula (II-1b), the same embodiment as in general formula (II-1) is preferably employed for $R^3$. $R^{4a}$ preferably represents an alkyl group having 1 to 3 carbon atoms, more preferably an alkyl group having 1 or 3 carbon atoms, and particularly preferably an alkyl group having 3 carbon atoms.

Among general formula (II-1a) and general formula (II-1b), general formula (II-1a) is preferably employed to increase the absolute value of dielectric anisotropy.

The liquid crystal layer in the liquid crystal display device of the present invention contains 25% to 45% of the compound represented by general formula (II-2), preferably 30% to 40% of the compound, and more preferably 31% to 36% of the compound.

In general formula (II-2), $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, further preferably an alkyl group having 3 to 5 carbon atoms or an alkenyl group having 2 carbon atoms, and particularly preferably an alkyl group having 3 carbon atoms.

$R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, preferably an alkyl group having 1 to 5 carbon atoms or an alkoxy group having 1 to 5 carbon atoms, more preferably an alkyl group having 1 to 3 carbon atoms or an alkoxy group having 1 to 3 carbon atoms, further preferably an alkyl group having 3 carbon atoms or an alkoxy group having 2 carbon atoms, and particularly preferably an alkoxy group having 2 carbon atoms.

B represents a 1,4-phenylene group or a trans-1,4-cyclohexylene group that may be substituted with fluorine, preferably an unsubstituted 1,4-phenylene group or trans-1,4-cyclohexylene group, and more preferably a trans-1,4-cyclohexylene group.

Specifically, the compound represented by general formula (II-2) is preferably compounds represented by general formula (II-2a) to general formula (II-2d) below.

[Chem. 9]

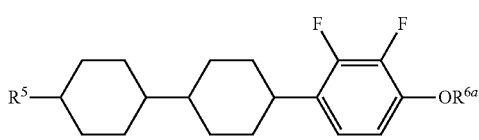

(II-2a)

-continued

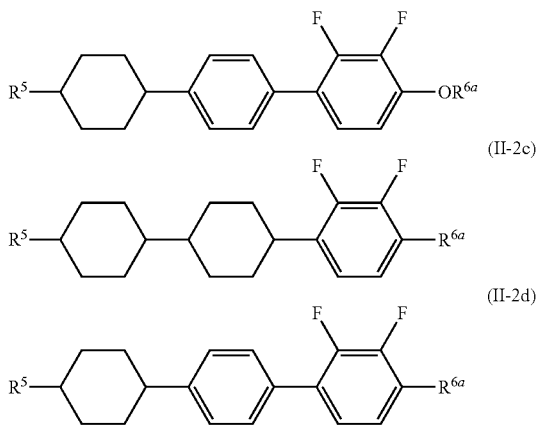

(II-2b)

(II-2c)

(II-2d)

(In the formula, $R^5$ represents an alkyl group having 1 to 5 carbon atoms or an alkenyl group having 2 to 5 carbon atoms and $R^{6a}$ represents an alkyl group having 1 to 5 carbon atoms, but the same embodiment as in $R^5$ and $R^6$ of general formula (II-2) is preferred.)

In general formula (II-2a) and general formula (II-2b), the same embodiment as in general formula (II-2) is preferably employed for $R^5$. $R^{6a}$ preferably represents an alkyl group having 1 to 3 carbon atoms, more preferably an alkyl group having 1 or 2 carbon atoms, and particularly preferably an alkyl group having 2 carbon atoms.

In general formula (II-2c) and general formula (II-2d), the same embodiment as in general formula (II-2) is preferably employed for $R^5$. $R^{6a}$ preferably represents an alkyl group having 1 to 3 carbon atoms, more preferably an alkyl group having 1 or 3 carbon atoms, and particularly preferably an alkyl group having 3 carbon atoms.

Among general formula (II-2a) and general formula (II-2b), general formula (II-2a) is preferably employed to increase the absolute value of dielectric anisotropy.

Furthermore, at least one compound represented by general formula (II-2) with B representing a 1,4-phenylene group and at least one compound represented by general formula (II-2) with B representing a trans-1,4-cyclohexylene group are preferably contained.

The liquid crystal layer in the liquid crystal display device of the present invention preferably further contains a compound represented by general formula (III),

[Chem. 10]

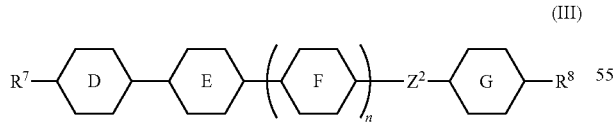

(III)

(in the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; D, E, F, and G each independently represent a 1,4-phenylene group or a trans-1,4-cyclohexylene group that may be substituted with fluorine; $Z^2$ represents a single bond, —OCH$_2$—, —OCO—, —CH$_2$O—, or —COO—; and n represents 0 or 1, where if n represents 0, $Z^2$ represents —OCH$_2$—, —OCO—, —CH$_2$O—, or —COO— or D, E, and G represent a 1,4-phenylene group that may be substituted with fluorine). The content of the compound represented by general formula (III) is preferably 5% to 20%, more preferably 8% to 15%, and further preferably 10% to 13%.

In general formula (III), $R^7$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms;

when D represents trans-1,4-cyclohexylene, $R^7$ preferably represents an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, further preferably an alkyl group having 3 to 5 carbon atoms or an alkenyl group having 2 carbon atoms, and particularly preferably an alkyl group having 3 carbon atoms; and when D represents a 1,4-phenylene group that may be substituted with fluorine, $R^7$ preferably represents an alkyl group having 1 to 5 carbon atoms or an alkenyl group having 4 or 5 carbon atoms, more preferably an alkyl group having 2 to 5 carbon atoms or an alkenyl group having 4 carbon atoms, and further preferably an alkyl group having 2 to 4 carbon atoms.

$R^8$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms;

when G represents trans-1,4-cyclohexylene, $R^8$ preferably represents an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, further preferably an alkyl group having 3 to 5 carbon atoms or an alkenyl group having 2 carbon atoms, and particularly preferably an alkyl group having 3 carbon atoms; and when G represents a 1,4-phenylene group that may be substituted with fluorine, $R^8$ preferably represents an alkyl group having 1 to 5 carbon atoms or an alkenyl group having 4 or 5 carbon atoms, more preferably an alkyl group having 2 to 5 carbon atoms or an alkenyl group having 4 carbon atoms, and further preferably an alkyl group having 2 to 4 carbon atoms.

When $R^7$ and $R^8$ represent an alkenyl group and D or G that is respectively bonded to $R^7$ and $R^8$ represents a 1,4-phenylene group that may be substituted with fluorine, the alkenyl group having 4 or 5 carbon atoms preferably has the following structures.

[Chem. 11]

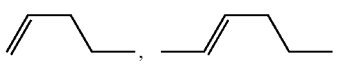

(In the formula, these structures are bonded to a ring structure at the right end). Also in this case, an alkenyl group having 4 carbon atoms is further preferred.

D, E, F, and G each independently represent a 1,4-phenylene group or trans-1,4-cyclohexylene that may be substituted with fluorine, preferably a 2-fluoro-1,4-phenylene group, a 2,3-difluoro-1,4-phenylene group, a 1,4-phenylene group, or trans-1,4-cyclohexylene, more preferably a 2-fluoro-1,4-phenylene group, a 2,3-difluoro-1,4- phenylene group, or a 1,4-phenylene group, and particularly preferably a 2,3-difluoro-1,4-phenylene group or a 1,4-phenylene group.

$Z^2$ represents a single bond, —OCH$_2$—, —OCO—, —CH$_2$O—, or —COO—, preferably a single bond, —CH$_2$O—, or —COO—, and more preferably a single bond.

Although n represents 0 or 1, when $Z^2$ represents a substituent other than a single bond, n preferably represents 0.

Specifically, when n represents 0, the compound represented by general formula (III) is preferably compounds represented by general formula (III-1a) to general formula (III-1h) below, Specifically, when n represents 1, the compound represented by general formula (III) is preferably compounds represented by general formula (III-2a) to general formula (III-21) below,

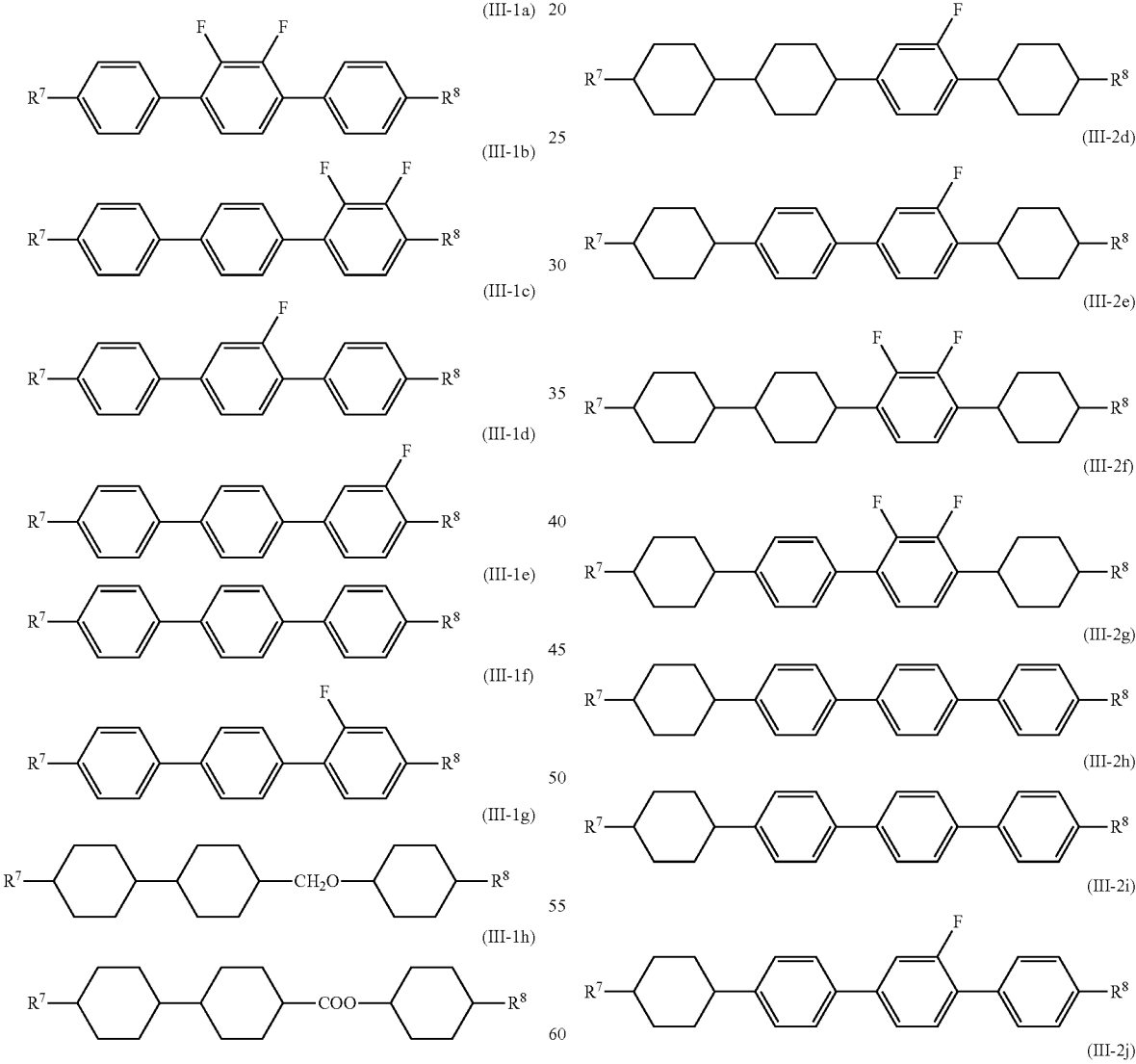
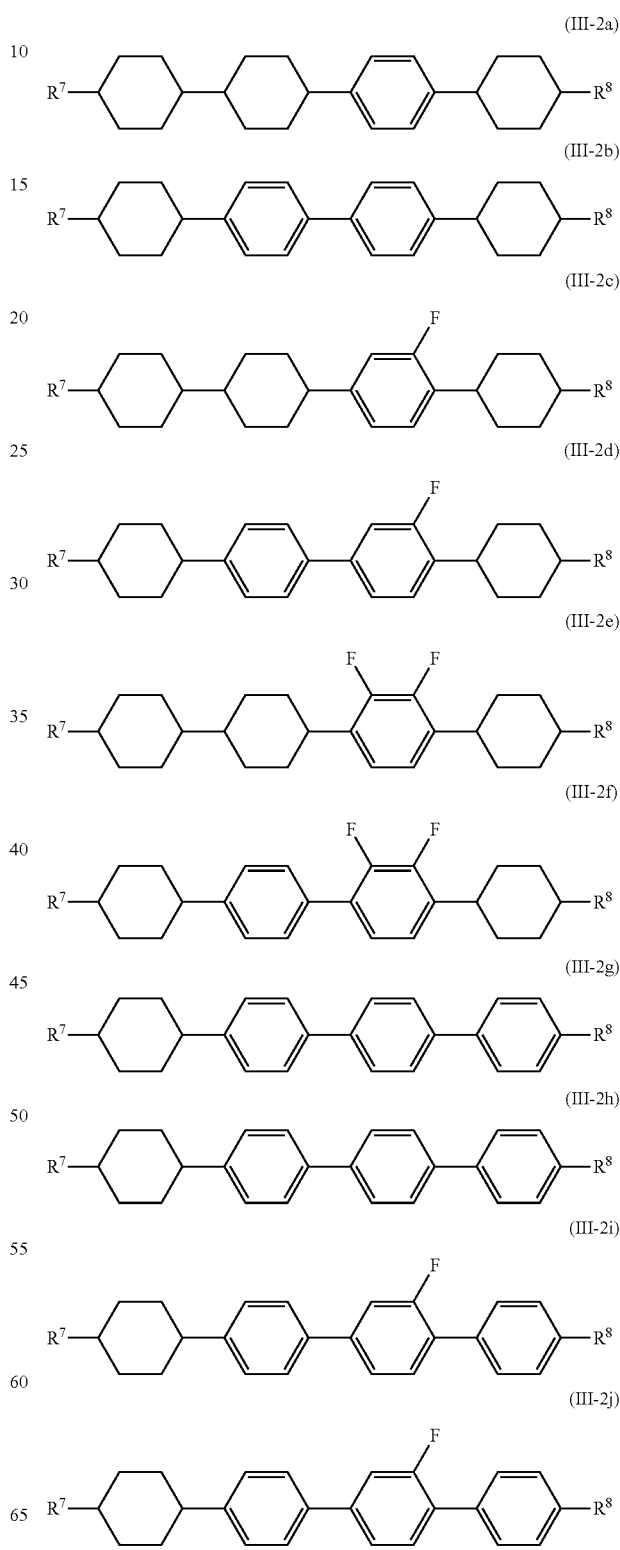

(in the formulae, R$^7$ and R$^8$ each independently represent an alkyl group having 1 to 5 carbon atoms, an alkenyl group having 2 to 5 carbon atoms, or an alkoxy group having 1 to 5 carbon atoms, but the same embodiment as in R$^7$ and R$^8$ of general formula (III) is preferred).

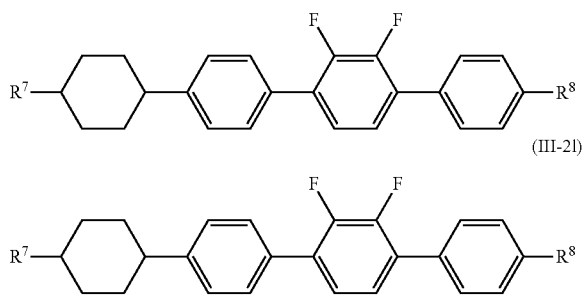

(in the formula, $R^7$ and $R^8$ each independently represent an alkyl group having 1 to 5 carbon atoms, an alkenyl group having 2 to 5 carbon atoms, or an alkoxy group having 1 to 5 carbon atoms, but the same embodiment as in $R^7$ and $R^8$ of general formula (III) is preferred).

The compounds represented by general formula (II-1) and general formula (II-2) are compounds having negative dielectric anisotropy whose absolute value is relatively high. The total content of these compounds is preferably 30% to 65%, more preferably 40% to 55%, and particularly preferably 43% to 50%.

The compound represented by general formula (III) includes compounds having positive dielectric anisotropy and compounds having negative dielectric anisotropy. When compounds having negative dielectric anisotropy whose absolute value is 0.3 or more are used, the total content of the compounds represented by general formula (II-1), general formula (II-2), and general formula (III) is preferably 35% to 70%, more preferably 45% to 65%, and particularly preferably 50% to 60%.

It is preferable to contain 30% to 50% of the compound represented by general formula (I) and 35% to 70% of the compounds represented by general formula (II-1), general formula (II-2), and general formula (III). It is more preferable to contain 35% to 45% of the compound represented by general formula (I) and 45% to 65% of the compounds represented by general formula (II-1), general formula (II-2), and general formula (III). It is particularly preferable to contain 38% to 42% of the compound represented by general formula (I) and 50% to 60% of the compounds represented by general formula (II-1), general formula (II-2), and general formula (III).

The total content of the compounds represented by general formula (I), general formula (II-1), general formula (II-2), and general formula (III) is preferably 80% to 100%, more preferably 90% to 100%, and particularly preferably 95% to 100% relative to the total amount of the composition.

The liquid crystal layer in the liquid crystal display device of the present invention can be used in the wide range of nematic phase-isotropic liquid phase transition temperature ($T_{ni}$), but the nematic phase-isotropic liquid phase transition temperature is preferably 60° C. to 120° C., more preferably 70° C. to 100° C., and particularly preferably 70° C. to 85° C.

The dielectric anisotropy is preferably −2.0 to −6.0, more preferably −2.5 to −5.0, and particularly preferably −2.5 to −3.5 at 25° C.

The refractive index anisotropy is preferably 0.08 to 0.13 and more preferably 0.09 to 0.12 at 25° C. More specifically, in the case of a small cell gap, the refractive index anisotropy is preferably 0.10 to 0.12. In the case of a large cell gap, the refractive index anisotropy is preferably 0.08 to 0.10.

The rotational viscosity (γ1) is preferably 150 or less, more preferably 130 or less, and particularly preferably 120 or less.

In the liquid crystal layer in the liquid crystal display device of the present invention, Z, which is a function of rotational viscosity and refractive index anisotropy, preferably has a particular value.

$$Z=\gamma1/\Delta n^2 \quad [\text{Math. 1}]$$

(In the formula, γ1 represents rotational viscosity and Δn represents refractive index anisotropy.)

Z is preferably 13000 or less, more preferably 12000 or less, and particularly preferably 11000 or less.

When the liquid crystal layer in the liquid crystal display device of the present invention is used for an active matrix display element, the liquid crystal layer needs to have a specific resistance of $10^{12}$ (Ω·m) or more, and preferably has a specific resistance of $10^{13}$ (Ω·m) or more, and more preferably $10^{14}$ (Ω·m) or more.

The liquid crystal layer in the liquid crystal display device of the present invention may contain, in addition to the above compounds, typical nematic liquid crystal, smectic liquid crystal, cholesteric liquid crystal, an antioxidant, an ultraviolet absorber, and a polymerizable monomer in accordance with the applications thereof.

The polymerizable monomer is preferably a bifunctional monomer represented by general formula (V),

[Chem. 14]

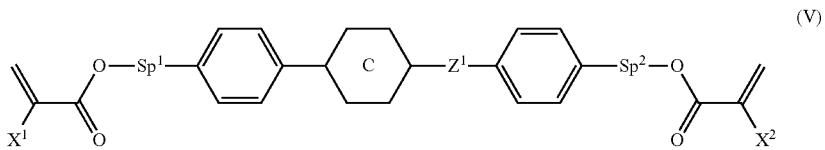

(in the formula, $X^1$ and $X^2$ each independently represent a hydrogen atom or a methyl group and $Sp^1$ and $Sp^2$ each independently represent a single bond, an alkylene group having 1 to 8 carbon atoms, or —O—$(CH_2)_s$— (where s represents an integer of 2 to 7 and the oxygen atom bonds to an aromatic ring);

$Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond; and C represents a 1,4-phenylene group, a trans-1,4-cyclohexylene group, or a single bond and, in all the 1,4-phenylene groups in the formula, any of hydrogen atoms may be substituted with fluorine atoms).

The polymerizable monomer is preferably any of a diacrylate derivative in which $X^1$ and $X^2$ each represent a hydrogen atom and a dimethacrylate derivative in which $X^1$ and $X^2$ each represent a methyl group, and is also preferably a compound in which one of $X^1$ and $X^2$ represents a hydrogen atom and the other represents a methyl group. Among these compounds, the diacrylate derivative has the highest rate of polymerization, the dimethacrylate derivative has a low rate of polymerization, and the asymmetrical compound has an intermediate rate of polymerization. A preferred one can be used in accordance with the applications. In a PSA display element, the dimethacrylate derivative is particularly preferably used.

$Sp^1$ and $Sp^2$ each independently represent a single bond, an alkylene group having 1 to 8 carbon atoms, or —O—$(CH_2)_s$—. In a PSA display element, at least one of $Sp^1$ and $Sp^2$ preferably represents a single bond. A compound in which $Sp^1$ and $Sp^2$ each represent a single bond or a compound in which one of $Sp^1$ and $Sp^2$ represents a single bond and the other represents an alkylene group having 1 to 8 carbon atoms or —O—$(CH_2)_s$— is preferred. In this case, an alkyl group having 1 to 4 carbon atoms is preferred and s is preferably 1 to 4.

$Z^1$ preferably represents —$OCH_2$—, —$CH_2O$—, —COO—, —OCO—, —$CF_2O$—, —$OCF_2$—, —$CH_2CH_2$—, —$CF_2CF_2$—, or a single bond, more preferably —COO—, —OCO—, or a single bond, and particularly preferably a single bond.

C represents a 1,4-phenylene group in which any of hydrogen atoms may be substituted with fluorine atoms, a trans-1,4-cyclohexylene group, or a single bond and preferably a 1,4-phenylene group or a single bond. When C represents a ring structure other than a single bond, $Z^1$ preferably represents a linking group other than a single bond. When C represents a single bond, $Z^1$ preferably represents a single bond.

In view of the foregoing, the ring structure between $Sp^1$ and $Sp^2$ in general formula (V) is preferably the following structure.

In the case where C represents a single bond and the ring structure is constituted by two rings in general formula (V), the ring structure is preferably represented by general formula (Va-1) to general formula (Va-5) below, more preferably represented by general formula (Va-1) to general formula (Va-3), and particularly preferably represented by general formula (Va-1).

[Chem. 15]

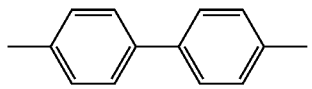
(Va-1)

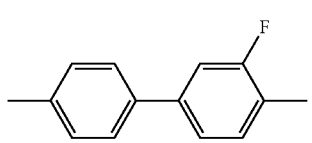
(Va-2)

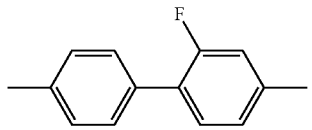
(Va-3)

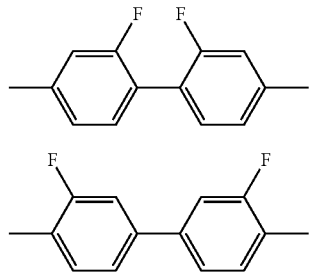
(Va-4)

(Va-5)

(In the formula, both ends bond to $Sp^1$ and $Sp^2$.)

The anchoring strength after the polymerization of the polymerizable compound having such a skeleton is suitable for PSA-type liquid crystal display elements, and a good alignment state is achieved. Therefore, the display unevenness is suppressed or completely prevented.

Accordingly, the polymerizable monomer is particularly preferably represented by general formula (V-1) to general formula (V-4) and most preferably represented by general formula (V-2).

[Chem. 16]

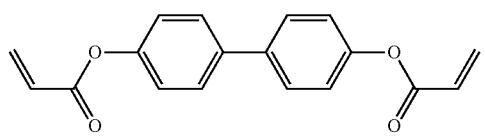
(V-1)

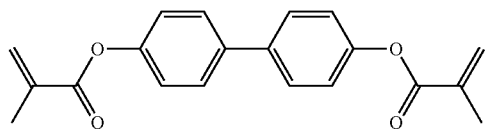
(V-2)

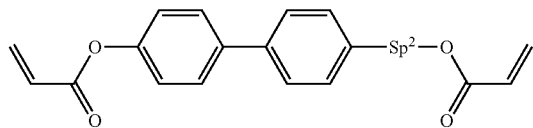
(V-3)

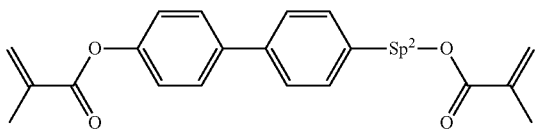
(V-4)

(In the formula, $Sp^2$ represents an alkylene group having 2 to 5 carbon atoms.)

In the case where the polymerizable monomer is added, polymerization proceeds without a polymerization initiator, but a polymerization initiator may be contained to facilitate the polymerization. Examples of the polymerization initiator include benzoin ethers, benzophenones, acetophenones, benzylketals, and acylphosphine oxides. To improve the storage stability, a stabilizer may be added. Examples of the stabilizer that can be used include hydroquinones, hydroquinone monoalkyl ethers, tertiary butyl catechols, pyrogallols, thiophenols, nitro compounds, β-naphthylamines, β-naphthols, and nitroso compounds.

The liquid crystal layer containing the polymerizable monomer is useful for liquid crystal display elements and particularly for active matrix liquid crystal display elements. The liquid crystal layer can be used for liquid crystal display elements that use a PSA mode, a PSVA mode, a VA mode, an IPS mode, or an ECB mode.

The liquid crystal layer containing the polymerizable monomer is provided with liquid crystal alignment capability by polymerizing the polymerizable monomer through irradiation with ultraviolet rays and is used for liquid crystal display elements that control the amount of transmitted light by using the birefringence of a liquid crystal composition. The liquid crystal layer is useful for liquid crystal display elements such as an AM-LCD (active matrix liquid crystal display element), a TN-LCD (twisted nematic liquid crystal display element), an STN-LCD (super-twisted nematic liquid crystal display element), an OCB-LCD, and an IPS-LCD (in-plane switching liquid crystal display element). The liquid crystal layer is particularly useful for AM-LCDs and can be used for transmission or reflection-type liquid crystal display elements.

(Color Filter)

A color filter of the present invention is constituted by a black matrix and at least RGB three color pixel portions. The RGB three color pixel portions contain, as coloring materials, a diketopyrrolopyrrole pigment and/or an anionic red organic dye in an R pixel portion, at least one selected from the group consisting of a halogenated copper phthalocyanine pigment, a phthalocyanine-based green dye, and a mixture of a phthalocyanine-based blue dye and an azo-based yellow organic dye in a G pixel portion, and an ∈-type copper phthalocyanine pigment and/or a cationic blue organic dye in a B pixel portion.

The RGB three color pixel portions preferably contain C.I. Solvent Red 124 or C.I. Pigment Red 254 as a coloring material in the R pixel portion.

The RGB three color pixel portions preferably contain a mixture of C.I. Solvent Blue 67 and C.I. Solvent Yellow 162 or C.I. Pigment Green 7 and/or 36 as a coloring material in the G pixel portion.

The RGB three color pixel portions preferably contain C.I. Solvent Blue 7 or C.I. Pigment Blue 15:6 as a coloring material in the B pixel portion.

The RGB three color pixel portions preferably contain, as coloring materials, C.I. Solvent Red 124 in the R pixel portion, a mixture of C.I. Solvent Blue 67 and C.I. Solvent Yellow 162 in the G pixel portion, and C.I. Solvent Blue 7 in the B pixel portion.

The RGB three color pixel portions also preferably contain, as coloring materials, C.I. Pigment Red 254 in the R pixel portion, C.I. Pigment Green 7 and/or 36 in the G pixel portion, and C.I. Pigment Blue 15:6 in the B pixel portion.

The RGB three color pixel portions preferably further contain, as a coloring material, at least one of organic dyes and pigments selected from the group consisting of C.I. Pigment Red 177, 242, 166, 167, and 179, C.I. Pigment Orange 38 and 71, C.I. Pigment Yellow 150, 215, 185, 138, and 139, C.I. Solvent Red 89, C.I. Solvent Orange 56, and C.I. Solvent Yellow 21, 82, 83:1, 33, and 162 in the R pixel portion.

The RGB three color pixel portions preferably further contain, as a coloring material, at least one of organic dyes and pigments selected from the group consisting of C.I. Pigment Yellow 150, 215, 185, and 138 and C.I. Solvent Yellow 21, 82, 83:1, and 33 in the G pixel portion.

The RGB three color pixel portions preferably further contain, as a coloring material, at least one of organic dyes and pigments selected from the group consisting of C.I. Pigment Blue 1, C.I. Pigment Violet 23, C.I. Basic Blue 7, C.I. Basic Violet 10, C.I. Acid Blue 1, 90, and 83, and C.I. Direct Blue 86 in the B pixel portion.

Preferably, the color filter is constituted by a black matrix, the RGB three color pixel portions, and a Y pixel portion, and the Y pixel portion contains, as a coloring material, at least one of yellow organic dyes and pigments selected from the group consisting of C.I. Pigment Yellow 150, 215, 185, 138, and 139 and C.I. Solvent Yellow 21, 82, 83:1, 33, and 162.

In the color filter according to the present invention, the chromaticity x and chromaticity y in the XYZ color system of each pixel portion with use of a C light source are preferably as follows from the viewpoint of preventing a decrease in the voltage holding ratio (VHR) of the liquid crystal layer and an increase in the ion density (ID) and suppressing problems of display defects such as white streaks, alignment unevenness, and image sticking.

The chromaticity x in the XYZ color system of the R pixel portion with use of a C light source is preferably 0.58 to 0.69 and more preferably 0.62 to 0.68 and the chromaticity y is preferably 0.30 to 0.36 and more preferably 0.31 to 0.35. Preferably, the chromaticity x is 0.58 to 0.69 and the chromaticity y is 0.30 to 0.36. More preferably, the chromaticity x is 0.62 to 0.68 and the chromaticity y is 0.31 to 0.35.

The chromaticity x in the XYZ color system of the G pixel portion with use of a C light source is preferably 0.19 to 0.35 and more preferably 0.20 to 0.26 and the chromaticity y is preferably 0.54 to 0.74 and more preferably 0.64 to 0.73. Preferably, the chromaticity x is 0.19 to 0.35 and the chromaticity y is 0.54 to 0.74. More preferably, the chromaticity x is 0.20 to 0.26 and the chromaticity y is 0.64 to 0.73.

The chromaticity x in the XYZ color system of the B pixel portion with use of a C light source is preferably 0.11 to 0.16 and more preferably 0.12 to 0.15 and the chromaticity y is preferably 0.04 to 0.15 and more preferably 0.05 to 0.10. Preferably, the chromaticity x is 0.11 to 0.16 and the chromaticity y is 0.04 to 0.15. More preferably, the chromaticity x is 0.12 to 0.15 and the chromaticity y is 0.05 to 0.10.

The chromaticity x in the XYZ color system of the Y pixel portion with use of a C light source is preferably 0.46 to 0.50 and more preferably 0.47 to 0.48 and the chromaticity y is preferably 0.48 to 0.53 and more preferably 0.50 to 0.52. Preferably, the chromaticity x is 0.46 to 0.50 and the chromaticity y is 0.48 to 0.53. More preferably, the chromaticity x is 0.47 to 0.48 and the chromaticity y is 0.50 to 0.52.

Herein, the XYZ color system is a color system approved as the standard color system by the CIE (International Commission on Illumination) in 1931.

The chromaticity in each pixel portion can be adjusted by changing the types of dyes and pigments used and the mixing ratio of the dyes and pigments. For example, in the case of the R pixel, the chromaticity can be adjusted by adding an appropriate amount of a yellow dye/pigment and/or an orange pigment to the red dye/pigment. In the case of the G pixel, the chromaticity can be adjusted by adding an appropriate amount of a yellow dye/pigment to the green dye/pigment. In the case of the B pixel, the chromaticity can be adjusted by adding an appropriate amount of a purple dye/pigment to the blue dye/pigment. The chromaticity can also be adjusted by appropriately controlling the particle size of a pigment.

In the color filter, the color filter pixel portions can be formed by a publicly known method. A typical example of a method for forming pixel portions is a photolithography method. In the photolithography method, a photo-curable composition described below is applied onto a surface of a transparent substrate for color filters on the black matrix side and dried by heating (pre-baked); pattern exposure is then performed by irradiating the photo-curable composition with ultraviolet rays through a photomask to cure the photo-curable composition in portions corresponding to pixel portions; and unexposed portions are developed with a developer to remove portions other than the pixel portions, whereby the pixel portions are fixed on the transparent substrate. In this method, pixel portions composed of a cured colored coating film of the photo-curable composition are formed on the transparent substrate.

The photo-curable composition described below is prepared for each of the R pixel, G pixel, B pixel, and optionally other pixels of different colors, such as the Y pixel and the above-described process is repeatedly performed. Thus, a color filter including colored pixel portions of the R pixel, G pixel, B pixel, and Y pixel in predetermined positions can be produced.

Examples of a method for applying the photo-curable composition described below onto the transparent substrate composed of glass or the like include a spin coating method, a roll coating method, and an ink-jet method.

The drying conditions of the coating film of the photo-curable composition applied onto the transparent substrate are normally 50° C. to 150° C. and about 1 to 15 minutes though depending on, for example, the types of components and the mixing ratio. The light used for the photo-curing of the photo-curable composition is preferably ultraviolet light in a wavelength range of 200 to 500 nm or visible light. Various light sources that emit light in this wavelength range can be used.

Examples of a developing method include a puddling method, a dipping method, and a spraying method. After the exposure and development of the photo-curable composition, the transparent substrate on which pixel portions of necessary colors have been formed is washed with water and dried. The thus-produced color filter is heat-treated (post-baked) at 90° C. to 280° C. for a predetermined time using a heating device such as a hot plate, an oven, or the like to remove volatile components in the colored coating film and, at the same time, heat-cure an unreacted photocurable compound remaining in the cured colored coating film of the photocurable composition, whereby the color filter is completed.

By using the coloring material for color filters of the present invention together with the liquid crystal composition of the present invention, there can be provided a liquid crystal display device in which a decrease in the voltage holding ratio (VHR) of the liquid crystal layer and an increase in the ion density (ID) are prevented and problems of display defects such as white streaks, alignment unevenness, and image sticking are overcome.

The photo-curable composition is generally produced by the method below. The dye and/or pigment composition for color filters of the present invention, an organic solvent, and a dispersant serving as essential components are stirred and dispersed so as to be uniformly mixed with each other in order to prepare a pigment dispersion liquid for forming pixel portions of a color filter. A photo-curable compound and optionally a thermoplastic resin, a photopolymerization initiator, and the like are added to the pigment dispersion liquid to produce the photo-curable composition.

Examples of the organic solvent used herein include aromatic solvents such as toluene, xylene, and methoxybenzene; acetate solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate; propionate solvents such as ethoxyethyl propionate; alcohol solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethyl formamide, γ-butyrolactam, N-methyl-2-pyrrolidone, aniline, and pyridine; lactone solvents such as γ-butyrolactone; and carbamates such as a mixture containing methyl carbamate and ethyl carbamate at a ratio of 48:52.

Examples of the dispersant used herein include DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, DISPERBYK 2150, DISPERBYK LPN21116, and DISPERBYK LPN6919 manufactured by BYK-Chemie GmbH; Efka 46, Efka 47, Efka 452, Efka LP4008, Efka 4009, Efka LP4010, Efka LP4050, LP4055, Efka 400, Efka 401, Efka 402, Efka 403, Efka 450, Efka 451, Efka 453, Efka 4540, Efka 4550, Efka LP4560, Efka 120, Efka 150, Efka 1501, Efka 1502, and Efka 1503 manufactured by Efka Chemicals Company; Solsperse 3000, Solsperse 9000, Solsperse 13240, Solsperse 13650, Solsperse 13940, Solsperse 17000, 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000 manufactured by Lubrizol Corporation; Ajisper PB711, Ajisper PB821, Ajisper PB822, Ajisper PB814, Ajisper PN411, and Ajisper PA111 manufactured by Ajinomoto Co., Ltd.; and synthetic resins which are liquid and water-insoluble at room temperature, e.g., acrylic resins, urethane resins, alkyd resins, natural rosin such as wood rosin, gum rosin, tall oil rosin, modified rosin such as polymerized rosin, disproportionated rosin, hydrogenated rosin, oxidized rosin, maleated rosin, and rosin derivatives such as rosin amine, lime rosin, rosin alkylene oxide adducts, rosin alkyd adducts, and rosin-modified phenol. The addition of these dispersants and resins contributes to a reduction in flocculation, an improvement in the dispersion stability of pigments, and an improvement in the viscous property of dispersions.

Examples of a dispersing aid include organic pigment derivatives such as phthalimidemethyl derivatives, sulfonic acid derivatives, N-(dialkylamino)methyl derivatives, and N-(dialkylaminoalkyl)sulfonic acid amide derivatives. Two or more different types of these derivatives can be used together.

Examples of the thermoplastic resin used to prepare the photo-curable composition include urethane resins, acrylic resins, polyamide resins, polyimide resins, styrene-maleic acid resins, and styrene-maleic anhydride resins.

Examples of the photo-curable compound include bifunctional monomers such as 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate; polyfunctional monomers having a relatively low molecular weight, such as trimethylolpropane triacrylate, pentaerythritol triacrylate, tris[2-(meth)acryloyloxyethyl]isocyanurate, dipentaerythritol hexaacrylate, and dipentaerythritol pentaacrylate; and polyfunctional monomers having a relatively high molecular weight, such as polyester acrylates, polyurethane acrylates, and polyether acrylates.

Examples of the photopolymerization initiator include acetophenone, benzophenone, benzyldimethyl ketal, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of a commercially available photopolymerization initiator include "Irgacure (trademark)-184", "Irgacure (trademark)-369", and "Darocur (trademark)-1173" manufactured by BASF; "Lucirin-TPO" manufactured by BASF; "Kayacure (trademark) DETX" and "Kayacure (trademark) OA" manufactured by Nippon Kayaku Co., Ltd.; "Vicure 10" and "Vicure 55" manufactured by Stauffer; "Trigonal PI" manufactured by Akzo; "Sandoray 1000" manufactured by Sandoz; "DEAP" manufactured by Upjohn Co.; and "Biimidazole" manufactured by Kurogane Kasei Co., Ltd.

A publicly known photosensitizer can also be used together with the photopolymerization initiator. Examples of the photosensitizer include amines, urea compounds, compounds containing a sulfur atom, compounds containing a phosphorus atom, compounds containing a chlorine atom, nitriles, and other compounds containing a nitrogen atom. They can be used alone or in combination of two or more.

The ratio of the photopolymerization initiator added is not particularly limited, but is preferably 0.1% to 30% by mass relative to the compound having a photo-polymerizable or photo-curable functional group. If the ratio is less than 0.1%, the sensitivity during photocuring tends to decrease. If the ratio is more than 30%, a crystal of the photopolymerization initiator is precipitated when a pigment dispersion resist coating film is dried and thus the physical properties of the coating film may be degraded.

Using the materials described above, 300 to 1000 parts by mass of the organic solvent and 1 to 100 parts by mass of the dispersant relative to 100 parts by mass of the dye and/or pigment composition for color filters of the present invention are stirred and dispersed so as to be uniformly mixed with each other. Thus, the die/pigment liquid can be prepared. Subsequently, 3 to 20 parts by mass of the thermoplastic resin and photo-curable compound in total relative to 1 part by mass of the pigment composition for color filters of the present invention, 0.05 to 3 parts by mass of the photopolymerization initiator relative to 1 part by mass of the photo-curable compound, and optionally an organic solvent are added to the pigment dispersion liquid and stirred and dispersed so as to be uniformly mixed with each other. Thus, a photo-curable composition for forming pixel portions of a color filter can be prepared.

A publicly known organic solvent or aqueous alkali solution can be used as the developer. In particular, in the case where the photo-curable composition contains a thermoplastic resin or a photo-curable compound and at least one of the thermoplastic resin and photo-curable compound has an acid value and exhibits alkali solubility, washing with an aqueous alkali solution is effective for formation of color filter pixel portions.

The method for forming color filter pixel portions by a photolithography method has been described in detail. The color filter pixel portions formed by using the pigment composition for color filters of the present invention may be formed by another method such as an electrodeposition method, a transfer method, a micelle electrolysis method, a PVED (photovoltaic electrodeposition) method, an inkjet method, a reverse printing method, or a heat curing method to produce a color filter.

(Alignment Film)

In the liquid crystal display device of the present invention, when an alignment film for aligning a liquid crystal composition needs to be formed on surfaces of first and second substrates that contact the liquid crystal composition, the alignment film is disposed between a color filter and a liquid crystal layer. However, the thickness of the alignment film is at most 100 nm or less, which does not completely block the interaction between a coloring agent such as a pigment constituting the color filter and a liquid crystal compound constituting the liquid crystal layer.

In a liquid crystal display device that does not use an alignment film, higher interaction occurs between a coloring agent such as a pigment constituting the color filter and a liquid crystal compound constituting the liquid crystal layer.

The alignment film can be composed of a transparent organic material such as polyimide, polyamide, BCB (benzocyclobutene polymer), or polyvinyl alcohol. In particular, the alignment film is preferably a polyimide alignment film formed by imidizing polyamic acid synthesized from a diamine such as an aliphatic or alicyclic diamine, e.g., p-phenylene diamine or 4,4'-diaminodiphenylmethane, an aliphatic or alicyclic tetracarboxylic acid anhydride such as butanetetracarboxylic acid anhydride or 2,3,5-tricarboxycyclopentylacetic acid anhydride, and an aromatic tetracarboxylic acid anhydride such as pyromellitic acid dianhydride. In this case, the alignment is generally provided by rubbing, but the alignment film can be used without providing alignment when used as a vertical alignment film or the like.

The alignment film can be composed of a material containing chalcone, cinnamate, cinnamoyl, or an azo group in a compound, and such a material may be used in combination with polyimide and polyamide. In this case, rubbing or an optical alignment technique may be used for the alignment film.

In the alignment film, a resin film is generally formed by applying the alignment film material onto a substrate by a method such as a spin coating method. A uniaxially stretching method, a Langmuir-Blodgett method, or the like can be employed.

(Transparent Electrode)

In the liquid crystal display device of the present invention, the transparent electrode can be composed of a material such as a conductive metal oxide. The metal oxide can be indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-added titanium dioxide ($Ti_{1-x}Nb_xO_2$), fluorine-doped tin oxide, graphene nanoribbon, or metal nanowire and is preferably zinc oxide (ZnO), indium tin oxide ($In_2O_3$—$SnO_2$), or indium zinc oxide ($In_2O_3$—ZnO). The transparent conductive film can be patterned by, for example, a photo-etching method or a method that uses a mask. By combining a backlight, the liquid crystal display device is used in various applications such as monitors of liquid crystal televisions and personal computers, displays of cellular phones and smart phones, notebook computers, mobile information terminals, and digital signage. Examples of the backlight include cold-cathode tube backlight, and pseudo-white backlight with two wavelength peaks and backlight with three wavelength peaks that use a light-emitting diode composed of an inorganic material or an organic EL element.

EXAMPLES

Part of preferred embodiments of the present invention will now be described in detail based on Examples, but the present invention is not limited to Examples. In compositions of Examples and Comparative Examples below, "%" means "% by mass".

In Examples, the measured properties are as follows.

$T_{ni}$: nematic phase-isotropic liquid phase transition temperature (° C.)

Δn: refractive index anisotropy at 25° C.

Δ∈: dielectric anisotropy at 25° C.

η: viscosity (mPa·s) at 20° C.

$γ_1$: rotational viscosity (mPa·s) at 25° C.

$d_{gap}$: gap (μm) between first substrate and second substrate of cell

VHR: voltage holding ratio (%) at 70° C.
(a value, which is expressed as a percentage, of the ratio of a measured voltage to an initial voltage, the measured voltage being obtained by inserting a liquid crystal composition into a cell having a thickness of 3.5 μm and performing measurement at an application voltage of 5 V, a frame time of 200 ms, and a pulse duration of 64 μs)

ID: ion density (pC/cm$^2$) at 70° C.
(an ion density obtained by inserting a liquid crystal composition into a cell having a thickness of 3.5 μm and performing measurement at an application voltage of 20 V and a frequency of 0.05 Hz using MTR-1 (manufactured by TOYO Corporation))

Image Sticking:

Image sticking of a liquid crystal display element was evaluated as follows. A predetermined fixed pattern was displayed in a display area for 1000 hours, and a uniform image was then displayed on the full screen. The level of a residual image of the fixed pattern was evaluated through visual inspection on the basis of the four-level criteria described below.

A: No residual image was observed.

B: A residual image was slightly observed, but was at an acceptable level.

C: A residual image was observed, and was at an unacceptable level.

D: A residual image was observed, and was at a very poor level.

In Examples, the following abbreviations are used for the description of compounds.

(Side Chain)

-n —$C_nH_{2n+1}$ a linear alkyl group having n carbon atoms

-On —$OC_nH_{2n+1}$ a linear alkoxy group having n carbon atoms (Ring Structure)

[Chem. 17]

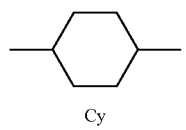

Cy

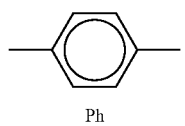

Ph

-continued

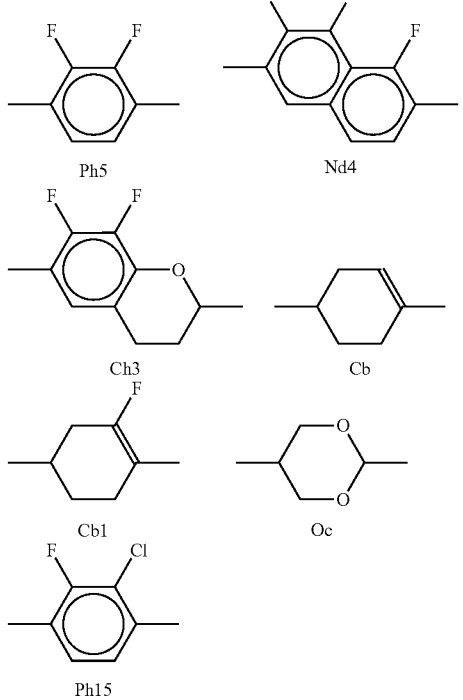

[Production of Color Filter]
[Preparation of Colored Composition]
[Red Dye-Colored Composition 1]

Into a plastic bottle, 10 parts of a red dye 1 (C.I. Solvent Red 124), 55 parts of propylene glycol monomethyl ether acetate, and 0.3 to 0.4 mmϕ SEPR beads were inserted, and they were dispersed with a paint conditioner (manufactured by Toyo Seiki Seisaku-sho, Ltd.) for four hours and then filtered with a 5-μm filter to obtain a dye-colored liquid. Then, 75.00 parts of the dye-colored liquid, 5.50 parts of polyester acrylate resin (Aronix (trademark) M7100 manufactured by TOAGOSEI CO., LTD.), 5.00 parts of dipentaerythritol hexaacrylate (KAYARAD (trademark) DPHA manufactured by Nippon Kayaku Co., Ltd.), 1.00 part of benzophenone (KAYACURE (trademark) BP-100 manufactured by Nippon Kayaku Co., Ltd.), and 13.5 parts of UCAR Ester EEP were stirred with a mixer and filtered with a filter having a pore size of 1.0 μm to obtain a red dye-colored composition 1.

[Red Dye-Colored Composition 2]

A red dye-colored composition 2 was prepared in the same manner as above, except that 8 parts of the red dye 1 (C.I. Solvent Red 124) and 2 parts of a yellow dye 2 (C.I. Solvent Yellow 21) were used instead of 10 parts of the red dye 1 of the red dye-colored composition 1.

[Red Dye-Colored Composition 3]

A red dye-colored composition 3 was prepared in the same manner as above, except that 10 parts of a red dye 2 (C.I. Solvent Red 1) was used instead of 10 parts of the red dye 1 of the red dye-colored composition 1.

[Green Dye-Colored Composition 1]

A green dye-colored composition 1 was prepared in the same manner as above, except that 3 parts of a blue dye 1 (C.I. Solvent Blue 67) and 7 parts of a yellow dye 1 (C.I. Solvent Yellow 162) were used instead of 10 parts of the red dye 1 of the red dye-colored composition 1.

[Green Dye-Colored Composition 2]

A green dye-colored composition 2 was prepared in the same manner as above, except that 4 parts of the yellow dye 1 (C.I. Solvent Yellow 162) and 3 parts of a yellow dye 3 (C.I. Solvent Yellow 82) were used instead of 7 parts of the yellow dye 1 of the green dye-colored composition 1.

[Green Dye-Colored Composition 3]

A green dye-colored composition 3 was prepared in the same manner as above, except that 10 parts of a green dye 1 (C.I. Solvent Green 7) was used instead of 3 parts of the blue dye 1 and 7 parts of the yellow dye 1 of the green dye-colored composition 1.

[Blue Dye-Colored Composition 1]

A blue dye-colored composition 1 was prepared in the same manner as above, except that 10 parts of a blue dye 1 (C.I. Solvent Blue 7) was used instead of 10 parts of the red dye 1 of the red dye-colored composition 1.

[Blue Dye-Colored Composition 2]

A blue dye-colored composition 2 was prepared in the same manner as above, except that 7 parts of the blue dye 1 (C.I. Solvent Blue 7) and 3 parts of a purple dye 1 (C.I. Basic Violet 10) were used instead of 10 parts of the blue dye 1 of the blue dye-colored composition 1.

[Blue Dye-Colored Composition 3]

A blue dye-colored composition 3 was prepared in the same manner as above, except that 10 parts of a blue dye 2 (C.I. Solvent Blue 12) was used instead of 7 parts of the blue dye 1 and 3 parts of the purple dye 1 of the blue dye-colored composition 2.

[Yellow Dye-Colored Composition 1]

A yellow dye-colored composition 1 was prepared in the same manner as above, except that 10 parts of a yellow dye 2 (C.I. Solvent Yellow 21) was used instead of 10 parts of the red dye 1 of the red dye-colored composition 1.

[Yellow Dye-Colored Composition 2]

A yellow dye-colored composition 2 was prepared in the same manner as above, except that 10 parts of a yellow dye 4 (C.I. Solvent Yellow 2) was used instead of 10 parts of the yellow dye 2 of the yellow dye-colored composition 1.

[Red Pigment-Colored Composition 1]

Into a plastic bottle, 10 parts of a red pigment 1 (C.I. Pigment Red 254, "IRGAPHOR RED BT-CF" manufactured by BASF), 55 parts of propylene glycol monomethyl ether acetate, 7.0 parts of DISPERBYK LPN21116 (manufactured by BYK-Chemie GmbH), and 0.3 to 0.4 mmϕ SEPR beads were inserted, and they were dispersed with a paint conditioner (manufactured by Toyo Seiki Seisaku-sho, Ltd.) for four hours and then filtered with a 5-μm filter to obtain a pigment dispersion liquid. Then, 75.00 parts of the pigment dispersion liquid, 5.50 parts of polyester acrylate resin (Aronix (trademark) M7100 manufactured by TOAGOSEI CO., LTD.), 5.00 parts of dipentaerythritol hexaacrylate (KAYARAD (trademark) DPHA manufactured by Nippon Kayaku Co., Ltd.), 1.00 part of benzophenone (KAYACURE (trademark) BP-100 manufactured by Nippon Kayaku Co., Ltd.), and 13.5 parts of UCAR Ester EEP were stirred with a mixer and filtered with a filter having a pore size of 1.0 μm to obtain a red pigment-colored composition 1.

[Red Pigment-Colored Composition 2]

A red pigment-colored composition 2 was prepared in the same manner as above, except that 6 parts of the red pigment 1, 2 parts of a red pigment 2 (C.I. Pigment Red 177, FASTOGEN SUPER RED ATY-TR manufactured by DIC Corporation), and 2 parts of a yellow pigment 2 (C.I. Pigment Yellow 139) were used instead of 10 parts of the red pigment 1 of the red pigment-colored composition 1.

[Green Pigment-Colored Composition 1]

A green pigment-colored composition 1 was prepared in the same manner as above, except that 6 parts of a green pigment 1 (C.I. Pigment Green 36, "FASTOGEN GREEN 2YK-CF" manufactured by DIC Corporation) and 4 parts of a yellow pigment 1 (C.I. Pigment Yellow 150, FANCHON FAST YELLOW E4GN manufactured by BAYER) were used instead of 10 parts of the red pigment 1 of the red pigment-colored composition 1.

[Green Pigment-Colored Composition 2]

A green pigment-colored composition 2 was prepared in the same manner as above, except that 4 parts of a green pigment 2 (C.I. Pigment Green 7, "FASTOGEN GREEN S" manufactured by DIC Corporation) and 6 parts of a yellow pigment 3 (C.I. Pigment Yellow 138) were used instead of 6 parts of the green pigment 1 and 4 parts of the yellow pigment 1 of the green pigment-colored composition 1.

[Blue Pigment-Colored Composition 1]

A blue pigment-colored composition 1 was prepared in the same manner as above, except that 9 parts of a blue pigment 1 (C.I. Pigment Blue 15:6, "FASTOGEN BLUE EP-210" manufactured by DIC Corporation) and 1 part of a purple pigment 1 (C.I. Pigment Violet 23) were used instead of 10 parts of the red pigment 1 of the red pigment-colored composition 1.

[Blue Pigment/Dye-Colored Composition 2]

A blue pigment/dye-colored composition 2 was prepared in the same manner as above, except that 1 part of a purple dye 1 (C.I. Basic Violet 10) was used instead of 1 part of the purple pigment 1 of the blue pigment-colored composition 1.

[Yellow Pigment-Colored Composition 1]

A yellow pigment-colored composition 1 was prepared in the same manner as above, except that 10 parts of a yellow pigment 1 (C.I. Pigment Yellow 150, FANCHON FAST YELLOW E4GN manufactured by BAYER) was used instead of 10 parts of the red pigment 1 of the red pigment-colored composition 1.

[Production of Color Filter]

A red colored composition was applied by spin coating onto a glass substrate on which a black matrix was formed in advance, so as to have a thickness of 2 μm. The red colored composition was dried at 70° C. for 20 minutes and then exposed to ultraviolet rays through a photomask in a striped pattern using an exposure device equipped with an ultrahigh-pressure mercury lamp. The exposed product was subjected to spray development with an alkali developer for 90 seconds, washed with ion-exchanged water, and air-dried. Subsequently, the resultant product was post-baked in a clean oven at 230° C. for 30 minutes to form a red pixel, which was a striped colored layer, on the transparent substrate.

Next, a green colored composition was applied by spin coating in the same manner so as to have a thickness of 2 μm. After drying, exposure and development were performed with an exposure device so that a striped colored layer was formed in a place shifted from the place of the red pixel. Thus, a green pixel adjacent to the red pixel was formed.

Next, a blue colored composition was applied by spin coating in the same manner so as to have a thickness of 2 μm to form a blue pixel adjacent to the red pixel and green pixel. Thus, a color filter including red, green, and blue striped pixels was produced on the transparent substrate.

When necessary, a yellow colored composition was applied by spin coating in the same manner so as to have a thickness of 2 μm to form a yellow pixel adjacent to the red pixel, green pixel and blue pixel. Thus, a color filter including red, green, blue, and yellow striped pixels was produced on the transparent substrate.

Color filters 1 to 4 and a comparative color filter 1 were produced using dye-colored compositions or pigment-colored compositions listed in Table 1.

TABLE 1

|  | Color filter 1 | Color filter 2 | Color filter 3 | Color filter 4 | Comparative color filter 1 |
|---|---|---|---|---|---|
| R pixel portion | Red dye-colored composition 1 | Red dye-colored composition 2 | Red pigment-colored composition 1 | Red pigment-colored composition 2 | Red dye-colored composition 3 |
| G pixel portion | Green dye-colored composition 1 | Green dye-colored composition 2 | Green pigment-colored composition 1 | Green pigment-colored composition 2 | Green dye-colored composition 3 |
| B pixel portion | Blue dye-colored composition 1 | Blue dye-colored composition 2 | Blue pigment-colored composition 1 | Blue pigment/dye-colored composition 2 | Blue dye-colored composition 3 |
| Y pixel portion | None | Yellow dye-colored composition 1 | None | Yellow pigment-colored composition 1 | Yellow dye-colored composition 2 |

In each of the pixel portions of the color filter, the x value and y value in the CIE 1931 XYZ color system with use of a C light source were measured with a microspectrophotometer including a microscope MX-50 manufactured by Olympus Corporation and a spectrophotometer MCPD-3000 manufactured by Otsuka Electronics Co., Ltd. Table below shows the results.

TABLE 2

|  | Color filter 1 (x, y) | Color filter 2 (x, y) | Color filter 3 (x, y) | Color filter 4 (x, y) | Comparative color filter (x, y) |
|---|---|---|---|---|---|
| R pixel portion | (0.63, 0.29) | (0.62, 0.31) | (0.62, 0.32) | (0.63, 0.33) | (0.59, 0.30) |
| G pixel portion | (0.26, 0.68) | (0.27, 0.69) | (0.24, 0.67) | (0.22, 0.65) | (0.20, 0.55) |
| B pixel portion | (0.17, 0.10) | (0.13, 0.14) | (0.14, 0.10) | (0.15, 0.07) | (0.14, 0.15) |
| Y pixel portion |  | (0.47, 0.51) |  | (0.48, 0.50) | (0.49, 0.48) |

Examples 1 to 4

An electrode structure was formed in first and second substrates, and an alignment film having a vertical alignment property was formed on each of surfaces of the first and second substrates facing each other. Then, a weak rubbing treatment was performed, a VA cell was made, and a liquid crystal composition 1 described below was sandwiched between the first substrate and the second substrate. Table 3 shows the physical properties of the liquid crystal composition 1. Subsequently, liquid crystal display devices of Examples 1 to 4 were produced using the color filters 1 to 4 listed in Table 1 ($d_{gap}$=3.5 μm, alignment film SE-5300). The VHR and ID of the produced liquid crystal display devices were measured. The image sticking of the produced liquid crystal display devices was also evaluated.

Table 4 shows the results.

[Chem. 18]

Liquid crystal composition 1

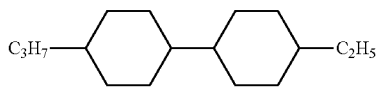

24% 3CyCy2

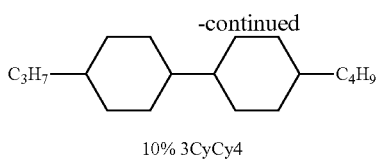

10% 3CyCy4

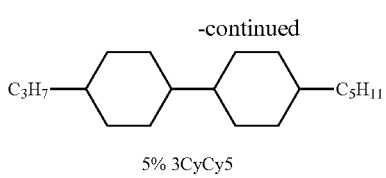

5% 3CyCy5

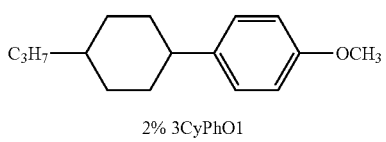

2% 3CyPhO1

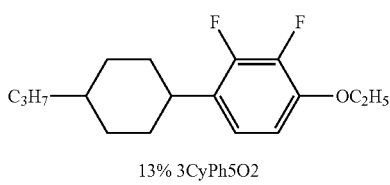

13% 3CyPh5O2

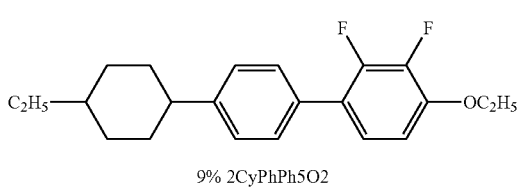

9% 2CyPhPh5O2

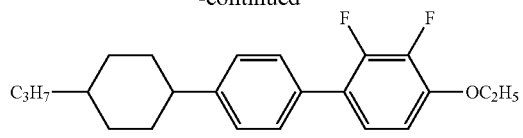

9% 3CyPhPh5O2

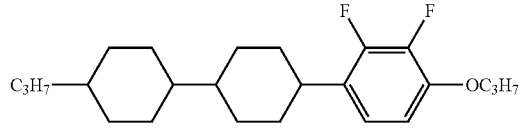

5% 3CyCyPh5O3

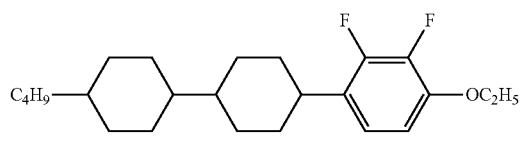

6% 4CyCyPh5O2

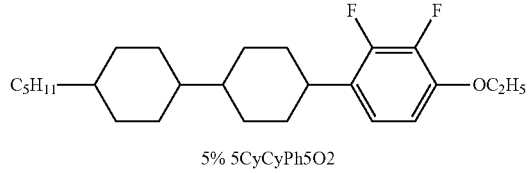

5% 5CyCyPh5O2

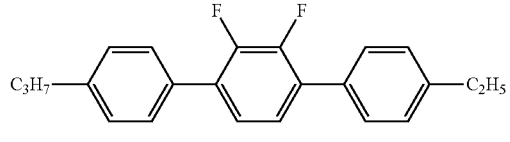

6% 3PhPh5Ph2

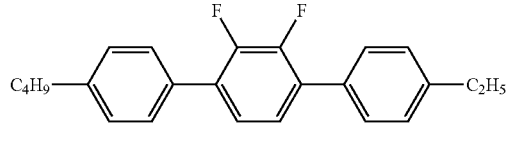

6% 4PhPh5Ph2

TABLE 3

| Liquid crystal composition 1 | |
|---|---|
| $T_{NI}/°C.$ | 81.0 |
| $\Delta n$ | 0.103 |
| $n_o$ | 1.483 |
| $\epsilon_{//}$ | 3.3 |
| $\epsilon_\perp$ | 6.2 |
| $\Delta\epsilon$ | −2.9 |
| $\eta/mPa \cdot s$ | 20.3 |
| $\gamma_1/mPa \cdot s$ | 112 |
| $\gamma_1/\Delta n^2 \times 10^{-2}$ | 105 |

TABLE 4

| | Example 1 | Example 2 | Example 3 | Example 4 |
|---|---|---|---|---|
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 98.9 | 99.2 | 99.5 | 99.4 |
| ID | 83 | 62 | 16 | 21 |
| Image sticking | B | A | A | A |

It was found that the liquid crystal composition 1 had a liquid crystal phase temperature range of 81° C., which was practical for use as liquid crystal compositions for TVs, a high absolute value of dielectric anisotropy, low viscosity, and an appropriate value of Δn.

In the liquid crystal display devices of Examples 1 to 4, high VHRs and low IDs were achieved. In the evaluation of image sticking, no residual image was observed or a residual image was slightly observed, which was at an acceptable level.

Examples 5 to 12

Liquid crystal compositions listed in Table 5 were sandwiched as in Example 1. Liquid crystal display devices of Examples 5 to 12 were produced using the color filters listed in Table 1 and the VHR and ID were measured. The image sticking of the liquid crystal display devices was also evaluated. Tables 6 and 7 show the results.

TABLE 5

| Liquid crystal composition 2 | | Liquid crystal composition 3 | |
|---|---|---|---|
| $T_{NI}/°C.$ | 76.0 | $T_{NI}/°C.$ | 84.8 |
| $\Delta n$ | 0.103 | $\Delta n$ | 0.103 |
| $n_o$ | 1.484 | $n_o$ | 1.484 |
| $\epsilon_{//}$ | 3.3 | $\epsilon_{//}$ | 3.2 |
| $\epsilon_\perp$ | 6.3 | $\epsilon_\perp$ | 6.1 |
| $\Delta\epsilon$ | −2.9 | $\Delta\epsilon$ | −2.9 |
| $\eta/mPa \cdot s$ | 19.8 | $\eta/mPa \cdot s$ | 21.4 |
| $\gamma_1/mPa \cdot s$ | 110 | $\gamma_1/mPa \cdot s$ | 119 |
| $\gamma_1/\Delta n^2 \times 10^{-2}$ | 103 | $\gamma_1/\Delta n^2 \times 10^{-2}$ | 112 |
| 3CyCy2 | 24% | 3CyCy2 | 24% |
| 3CyCy4 | 10% | 3CyCy4 | 11% |
| 3CyPhO1 | 7% | 3CyPh5O2 | 12% |
| 3CyPh5O2 | 14% | 2CyPhPh5O2 | 5% |
| 2CyPhPh5O2 | 7% | 3CyPhPh5O2 | 6% |
| 3CyPhPh5O2 | 9% | 3CyCyPh5O3 | 8% |
| 3CyCyPh5O3 | 5% | 4CyCyPh5O2 | 8% |
| 4CyCyPh5O2 | 7% | 5CyCyPh5O2 | 8% |
| 5CyCyPh5O2 | 5% | 3PhPh5Ph2 | 6% |
| 3PhPh5Ph2 | 6% | 4PhPh5Ph2 | 6% |
| 4PhPh5Ph2 | 6% | 5PhPh1 | 3% |
| | | 3CyCyPh1 | 3% |

TABLE 6

| | Example 5 | Example 6 | Example 7 | Example 8 |
|---|---|---|---|---|
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.0 | 99.4 | 99.7 | 99.6 |
| ID | 77 | 38 | 14 | 24 |
| Image sticking | B | A | A | A |

TABLE 7

|  | Example 9 | Example 10 | Example 11 | Example 12 |
|---|---|---|---|---|
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.0 | 99.3 | 99.6 | 99.4 |
| ID | 79 | 42 | 19 | 35 |
| Image sticking | B | B | A | A |

In the liquid crystal display devices of Examples 5 to 12, high VHRs and low IDs were achieved. In the evaluation of image sticking, no residual image was observed or a residual image was slightly observed, which was at an acceptable level.

Examples 13 to 24

Liquid crystal compositions listed in Table 8 were sandwiched as in Example 1. Liquid crystal display devices of Examples 13 to 24 were produced using the color filters listed in Table 1 and the VHR and ID were measured. The image sticking of the liquid crystal display devices was also evaluated. Tables 9 to 11 show the results.

TABLE 8

| Liquid crystal composition 4 | | Liquid crystal composition 5 | | Liquid crystal composition 6 | |
|---|---|---|---|---|---|
| $T_{NI}/°C$ | 74.9 | $T_{NI}/°C$ | 80.2 | $T_{NI}/°C$ | 85.7 |
| $\Delta n$ | 0.102 | $\Delta n$ | 0.105 | $\Delta n$ | 0.104 |
| no | 1.484 | no | 1.485 | no | 1.484 |
| $\epsilon_{//}$ | 3.2 | $\epsilon_{//}$ | 3.2 | $\epsilon_{//}$ | 3.2 |
| $\epsilon_{\perp}$ | 6.1 | $\epsilon_{\perp}$ | 6.1 | $\epsilon_{\perp}$ | 6.1 |
| $\Delta\epsilon$ | -2.9 | $\Delta\epsilon$ | -2.9 | $\Delta\epsilon$ | -3.0 |
| $\eta$/mPa·s | 21.1 | $\eta$/mPa·s | 22.7 | $\eta$/mPa·s | 22.9 |
| $\gamma_1$/mPa·s | 116 | $\gamma_1$/mPa·s | 124 | $\gamma_1$/mPa·s | 126 |
| $\gamma_1/\Delta n^2 \times 10^{-2}$ | 111 | $\gamma_1/\Delta n^2 \times 10^{-2}$ | 112 | $\gamma_1/\Delta n^2 \times 10^{-2}$ | 116 |
| 3CyCy2 | 22% | 3CyCy2 | 20% | 3CyCy2 | 20% |
| 3CyCy4 | 11% | 3CyCy4 | 10% | 3CyCy4 | 10% |
| 3CyPh5O2 | 7% | 3CyPh5O2 | 7% | 3CyPh5O2 | 7% |
| 3CyPh5O4 | 8% | 3CyPh5O4 | 7% | 3CyPh5O4 | 7% |
| 2CyPhPh5O2 | 6% | 2CyPhPh5O2 | 6% | 2CyPhPh5O2 | 6% |
| 3CyPhPh5O2 | 7% | 3CyPhPh5O2 | 7% | 3CyPhPh5O2 | 7% |
| 3CyCyPh5O3 | 7% | 3CyCyPh5O3 | 7% | 3CyCyPh5O3 | 7% |
| 4CyCyPh5O2 | 7% | 4CyCyPh5O2 | 8% | 4CyCyPh5O2 | 8% |
| 5CyCyPh5O2 | 7% | 5CyCyPh5O2 | 7% | 5CyCyPh5O2 | 7% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |
| 5PhPh1 | 8% | 5PhPh1 | 8% | 5PhPh1 | 5% |
| 3CyCyPh1 | 2% | 3CyCyPh1 | 5% | 3CyCyPh1 | 8% |

TABLE 9

|  | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.0 | 99.3 | 99.4 | 99.5 |
| ID | 71 | 57 | 25 | 18 |
| Image sticking | B | A | A | A |

TABLE 10

|  | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.1 | 99.4 | 99.6 | 99.5 |
| ID | 72 | 29 | 16 | 20 |
| Image sticking | B | A | A | A |

TABLE 11

|  | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.0 | 99.3 | 99.6 | 99.4 |
| ID | 74 | 60 | 17 | 25 |
| Image sticking | B | B | A | A |

In the liquid crystal display devices of Examples 13 to 24, high VHRs and low IDs were achieved. In the evaluation of image sticking, no residual image was observed or a residual image was slightly observed, which was at an acceptable level.

Examples 25 to 36

Liquid crystal compositions listed in Table 12 were sandwiched as in Example 1. Liquid crystal display devices of Examples 25 to 36 were produced using the color filters listed in Table 1 and the VHR and ID were measured. The image sticking of the liquid crystal display devices was also evaluated. Tables 13 to 15 show the results.

TABLE 12

| | Liquid crystal composition 7 | | Liquid crystal composition 8 | | Liquid crystal composition 9 |
|---|---|---|---|---|---|
| $T_{NI}/°C$ | 75.1 | $T_{NI}/°C$ | 80.4 | $T_{NI}/°C$ | 85.1 |
| $\Delta n$ | 0.103 | $\Delta n$ | 0.103 | $\Delta n$ | 0.103 |
| no | 1.484 | no | 1.485 | no | 1.484 |
| $\epsilon_{//}$ | 3.3 | $\epsilon_{//}$ | 3.3 | $\epsilon_{//}$ | 3.2 |
| $\epsilon_\perp$ | 5.9 | $\epsilon_\perp$ | 5.9 | $\epsilon_\perp$ | 5.8 |
| $\Delta\epsilon$ | −2.6 | $\Delta\epsilon$ | −2.6 | $\Delta\epsilon$ | −2.6 |
| $\eta/mPa \cdot s$ | 20.5 | $\eta/mPa \cdot s$ | 21.6 | $\eta/mPa \cdot s$ | 22.7 |
| $\gamma_1/mPa \cdot s$ | 117 | $\gamma_1/mPa \cdot s$ | 125 | $\gamma_1/mPa \cdot s$ | 130 |
| $\gamma_1/\Delta n^2 \times 10^{-2}$ | 110 | $\gamma_1/\Delta n^2 \times 10^{-2}$ | 117 | $\gamma_1/\Delta n^2 \times 10^{-2}$ | 122 |
| 3CyCy2 | 15% | 3CyCy2 | 15% | 3CyCy2 | 10% |
| 3CyCy4 | 12% | 3CyCy4 | 12% | 3CyCy4 | 15% |
| 3CyCy5 | 7% | 3CyCy5 | 7% | 3CyCy5 | 12% |
| 3CyPhO1 | 12% | 3CyPhO1 | 12% | 3CyPhO1 | 9% |
| 3CyPh5O2 | 6% | 3CyPh5O2 | 5% | 3CyPh5O2 | 5% |
| 3CyPh5O4 | 7% | 3CyPh5O4 | 5% | 3CyPh5O4 | 5% |
| 2CyPhPh5O2 | 11% | 2CyPhPh5O2 | 11% | 2CyPhPh5O2 | 11% |
| 3CyPhPh5O2 | 12% | 3CyPhPh5O2 | 11% | 3CyPhPh5O2 | 11% |
| 3CyCyPh5O3 | 3% | 3CyCyPh5O3 | 4% | 3CyCyPh5O3 | 4% |
| 4CyCyPh5O2 | 4% | 4CyCyPh5O2 | 6% | 4CyCyPh5O2 | 6% |
| 5CyCyPh5O2 | 3% | 5CyCyPh5O2 | 4% | 5CyCyPh5O2 | 4% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |

TABLE 13

| | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.0 | 99.3 | 99.6 | 99.4 |
| ID | 88 | 57 | 23 | 33 |
| Image sticking | B | B | A | A |

TABLE 14

| | Example 29 | Example 30 | Example 31 | Example 32 |
|---|---|---|---|---|
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 98.9 | 99.3 | 99.7 | 99.6 |
| ID | 108 | 68 | 13 | 17 |
| Image sticking | B | B | A | A |

TABLE 15

| | Example 33 | Example 34 | Example 35 | Example 36 |
|---|---|---|---|---|
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.0 | 99.3 | 99.6 | 99.4 |
| ID | 100 | 59 | 19 | 34 |
| Image sticking | B | B | A | A |

In the liquid crystal display devices of Examples 25 to 36, high VHRs and low IDs were achieved. In the evaluation of image sticking, no residual image was observed or a residual image was slightly observed, which was at an acceptable level.

Examples 37 to 48

Liquid crystal compositions listed in Table 16 were sandwiched as in Example 1. Liquid crystal display devices of Examples 37 to 48 were produced using the color filters listed in Table 1 and the VHR and ID were measured. The image sticking of the liquid crystal display devices was also evaluated. Tables 17 to 19 show the results.

TABLE 16

| | Liquid crystal composition 10 | | Liquid crystal composition 11 | | Liquid crystal composition 12 |
|---|---|---|---|---|---|
| $T_{NI}/°C$ | 76.6 | $T_{NI}/°C$ | 80.2 | $T_{NI}/°C$ | 85.7 |
| $\Delta n$ | 0.106 | $\Delta n$ | 0.102 | $\Delta n$ | 0.101 |
| no | 1.487 | no | 1.485 | no | 1.484 |
| $\epsilon_{//}$ | 3.3 | $\epsilon_{//}$ | 3.2 | $\epsilon_{//}$ | 3.2 |
| $\epsilon_\perp$ | 5.8 | $\epsilon_\perp$ | 5.8 | $\epsilon_\perp$ | 5.9 |
| $\Delta\epsilon$ | −2.6 | $\Delta\epsilon$ | −2.6 | $\Delta\epsilon$ | −2.7 |
| $\eta/mPa \cdot s$ | 22.7 | $\eta/mPa \cdot s$ | 22.0 | $\eta/mPa \cdot s$ | 22.2 |
| $\gamma_1/mPa \cdot s$ | 134 | $\gamma_1/mPa \cdot s$ | 129 | $\gamma_1/mPa \cdot s$ | 131 |
| $\gamma_1/\Delta n^2 \times 10^{-2}$ | 119 | $\gamma_1/\Delta n^2 \times 10^{-2}$ | 124 | $\gamma_1/\Delta n^2 \times 10^{-2}$ | 128 |
| 3CyCy2 | 24% | 3CyCy2 | 24% | 3CyCy2 | 24% |
| 3CyCy4 | 6% | 3CyCy4 | 10% | 3CyCy4 | 10% |
| 3CyPhO1 | 5% | 3CyPhO1 | 4% | 3CyPhO1 | 4% |
| 3CyPh5O4 | 9% | 3CyPh5O4 | 9% | 3CyPh5O4 | 9% |
| 2CyPhPh5O2 | 8% | 2CyPhPh5O2 | 8% | 2CyPhPh5O2 | 8% |
| 3CyPhPh5O2 | 8% | 3CyPhPh5O2 | 8% | 3CyPhPh5O2 | 8% |
| 3CyCyPh5O3 | 7% | 3CyCyPh5O3 | 7% | 3CyCyPh5O3 | 7% |

TABLE 16-continued

| Liquid crystal composition 10 | | Liquid crystal composition 11 | | Liquid crystal composition 12 | |
|---|---|---|---|---|---|
| 4CyCyPh5O2 | 9% | 4CyCyPh5O2 | 9% | 4CyCyPh5O2 | 9% |
| 5CyCyPh5O2 | 7% | 5CyCyPh5O2 | 7% | 5CyCyPh5O2 | 7% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |
| 5PhPh1 | 9% | 5PhPh1 | 6% | 5PhPh1 | 3% |
| | | | | 3CyCyPh1 | 3% |

TABLE 17

| | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 98.9 | 99.3 | 99.5 | 99.4 |
| ID | 104 | 65 | 21 | 37 |
| Image sticking | B | A | A | A |

TABLE 18

| | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.1 | 99.4 | 99.7 | 99.6 |
| ID | 95 | 45 | 12 | 18 |
| Image sticking | B | B | A | A |

TABLE 19

| | Example 45 | Example 46 | Example 47 | Example 48 |
|---|---|---|---|---|
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.1 | 99.4 | 99.8 | 99.6 |
| ID | 94 | 56 | 11 | 18 |
| Image sticking | B | B | A | A |

In the liquid crystal display devices of Examples 37 to 48, high VHRs and low IDs were achieved. In the evaluation of image sticking, no residual image was observed or a residual image was slightly observed, which was at an acceptable level.

Examples 49 to 60

Liquid crystal compositions listed in Table 20 were sandwiched as in Example 1. Liquid crystal display devices of Examples 49 to 60 were produced using the color filters listed in Table 1 and the VHR and ID were measured. The image sticking of the liquid crystal display devices was also evaluated. Tables 21 to 23 show the results.

TABLE 20

| Liquid crystal composition 13 | | Liquid crystal composition 14 | | Liquid crystal composition 15 | |
|---|---|---|---|---|---|
| $T_{NI}/°C$ | 75.3 | $T_{NI}/°C$ | 80.3 | $T_{NI}/°C$ | 85.9 |
| $\Delta n$ | 0.105 | $\Delta n$ | 0.106 | $\Delta n$ | 0.107 |
| no | 1.485 | no | 1.486 | no | 1.485 |
| $\epsilon_{//}$ | 3.3 | $\epsilon_{//}$ | 3.3 | $\epsilon_{//}$ | 3.3 |
| $\epsilon_{\perp}$ | 6.2 | $\epsilon_{\perp}$ | 6.2 | $\epsilon_{\perp}$ | 6.3 |
| $\Delta_\epsilon$ | −2.9 | $\Delta_\epsilon$ | −2.9 | $\Delta_\epsilon$ | −3.0 |
| $\eta$/mPa·s | 20.2 | $\eta$/mPa·s | 21.4 | $\eta$/mPa·s | 23.2 |
| $\gamma_1$/mPa·s | 113 | $\gamma_1$/mPa·s | 121 | $\gamma_1$/mPa·s | 129 |
| $\gamma_1/\Delta n^2 \times 10^{-2}$ | 103 | $\gamma_1/\Delta n^2 \times 10^{-2}$ | 107 | $\gamma_1/\Delta n^2 \times 10^{-2}$ | 114 |
| 3CyCy2 | 24% | 3CyCy2 | 23% | 3CyCy2 | 16% |
| 3CyCy4 | 5% | 3CyCy4 | 5% | 3CyCy4 | 9% |
| 3CyPhO1 | 7% | 3CyPhO1 | 7% | 3CyCy5 | 3% |
| 2CyPh5O2 | 9% | 2CyPh5O2 | 8% | 3CyPhO1 | 6% |
| 3CyPh5O4 | 8% | 3CyPh5O4 | 7% | 2CyPh5O2 | 8% |
| 2CyPhPh5O2 | 7% | 2CyPhPh5O2 | 7% | 3CyPh5O4 | 7% |
| 3CyPhPh5O2 | 9% | 3CyPhPh5O2 | 9% | 2CyPhPh5O2 | 7% |
| 3CyCyPh5O3 | 5% | 3CyCyPh5O3 | 5% | 3CyPhPh5O2 | 9% |
| 4CyCyPh5O2 | 5% | 4CyCyPh5O2 | 6% | 3CyCyPh5O3 | 5% |
| 5CyCyPh5O2 | 4% | 5CyCyPh5O2 | 5% | 4CyCyPh5O2 | 6% |
| 3PhPh5Ph2 | 5% | 3PhPh5Ph2 | 5% | 5CyCyPh5O2 | 6% |
| 4PhPh5Ph2 | 6% | 4PhPh5Ph2 | 6% | 3PhPh5Ph2 | 5% |
| 3CyCyPh1 | 6% | 3CyCyPh1 | 7% | 4PhPh5Ph2 | 5% |
| | | | | 3CyCyPh1 | 8% |

TABLE 21

|  | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.0 | 99.3 | 99.6 | 99.4 |
| ID | 95 | 62 | 21 | 48 |
| Image sticking | B | B | A | A |

In the liquid crystal display devices of Examples 49 to 60, high VHRs and low IDs were achieved. In the evaluation of image sticking, no residual image was observed or a residual image was slightly observed, which was at an acceptable level.

Examples 61 to 72

Liquid crystal compositions listed in Table 24 were sandwiched as in Example 1. Liquid crystal display devices of Examples 61 to 72 were produced using the color filters listed in Table 1 and the VHR and ID were measured. The image sticking of the liquid crystal display devices was also evaluated. Tables 25 to 27 show the results.

TABLE 24

| Liquid crystal composition 16 | | Liquid crystal composition 17 | | Liquid crystal composition 18 | |
|---|---|---|---|---|---|
| $T_{NI}/°C$ | 76.0 | $T_{NI}/°C$ | 81.3 | $T_{NI}/°C$ | 84.7 |
| $\Delta n$ | 0.105 | $\Delta n$ | 0.106 | $\Delta n$ | 0.108 |
| no | 1.484 | no | 1.483 | no | 1.484 |
| $\epsilon_{//}$ | 3.3 | $\epsilon_{//}$ | 3.2 | $\epsilon_{//}$ | 3.2 |
| $\epsilon_{\perp}$ | 6.0 | $\epsilon_{\perp}$ | 6.0 | $\epsilon_{\perp}$ | 6.0 |
| $\Delta_{\epsilon}$ | −2.7 | $\Delta_{\epsilon}$ | −2.8 | $\Delta_{\epsilon}$ | −2.8 |
| $\eta/mPa \cdot s$ | 20.6 | $\eta/mPa \cdot s$ | 20.7 | $\eta/mPa \cdot s$ | 21.7 |
| $\gamma_1/mPa \cdot s$ | 118 | $\gamma_1/mPa \cdot s$ | 117 | $\gamma_1/mPa \cdot s$ | 123 |
| $\gamma_1/\Delta n^2 \times 10^{-2}$ | 106 | $\gamma_1/\Delta n^2 \times 10^{-2}$ | 105 | $\gamma_1/\Delta n^2 \times 10^{-2}$ | 105 |
| 3CyCy2 | 19% | 3CyCy2 | 21% | 3CyCy2 | 19% |
| 3CyCy4 | 12% | 3CyCy4 | 12% | 3CyCy4 | 12% |
| 3CyCy5 | 5% | 3CyCy5 | 5% | 3CyCy5 | 4% |
| 3CyPhO1 | 5% | 2CyPh5O2 | 7% | 2CyPh5O2 | 7% |
| 2CyPh5O2 | 7% | 3CyPh5O4 | 8% | 3CyPh5O4 | 8% |
| 3CyPh5O4 | 8% | 2CyPhPh5O2 | 7% | 2CyPhPh5O2 | 7% |
| 2CyPhPh5O2 | 7% | 3CyPhPh5O2 | 7% | 3CyPhPh5O2 | 7% |
| 3CyPhPh5O2 | 7% | 3CyCyPh5O3 | 5% | 3CyCyPh5O3 | 5% |
| 3CyCyPh5O3 | 5% | 4CyCyPh5O2 | 5% | 4CyCyPh5O2 | 5% |
| 4CyCyPh5O2 | 5% | 5CyCyPh5O2 | 5% | 5CyCyPh5O2 | 5% |
| 5CyCyPh5O2 | 5% | 3PhPh5Ph2 | 7% | 3PhPh5Ph2 | 7% |
| 3PhPh5Ph2 | 7% | 4PhPh5Ph2 | 8% | 4PhPh5Ph2 | 8% |
| 4PhPh5Ph2 | 8% | 3CyCyPh1 | 3% | 3CyCyPh1 | 6% |

TABLE 22

|  | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 98.9 | 99.3 | 99.5 | 99.4 |
| ID | 103 | 58 | 23 | 36 |
| Image sticking | B | B | A | A |

TABLE 23

|  | Example 57 | Example 58 | Example 59 | Example 60 |
|---|---|---|---|---|
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.0 | 99.3 | 99.4 | 99.4 |
| ID | 90 | 64 | 32 | 34 |
| Image sticking | B | A | A | A |

TABLE 25

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 98.9 | 99.2 | 99.5 | 99.4 |
| ID | 92 | 64 | 30 | 51 |
| Image sticking | B | B | A | A |

TABLE 26

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.0 | 99.3 | 99.4 | 99.3 |
| ID | 88 | 55 | 33 | 47 |
| Image sticking | B | A | A | A |

TABLE 27

|  | Example 69 | Example 70 | Example 71 | Example 72 |
|---|---|---|---|---|
| Liquid crystal composition | Liquid crystal composition 18 | Liquid crystal composition 18 | Liquid crystal composition 18 | Liquid crystal composition 18 |
| Color filter | Color filter 1 | Color filter 2 | Color filter 3 | Color filter 4 |
| VHR | 98.9 | 99.2 | 99.5 | 99.3 |
| ID | 94 | 59 | 28 | 43 |
| Image sticking | B | A | A | A |

In the liquid crystal display devices of Examples 61 to 72, high VHRs and low IDs were achieved. In the evaluation of image sticking, no residual image was observed or a residual image was slightly observed, which was at an acceptable level.

Examples 73 to 84

Liquid crystal compositions listed in Table 28 were sandwiched as in Example 1. Liquid crystal display devices of Examples 73 to 84 were produced using the color filters listed in Table 1 and the VHR and ID were measured. The image sticking of the liquid crystal display devices was also evaluated. Tables 29 to 31 show the results.

TABLE 28

| Liquid crystal composition 19 | | Liquid crystal composition 20 | | Liquid crystal composition 21 | |
|---|---|---|---|---|---|
| $T_{NI}/°C$ | 77.1 | $T_{NI}/°C$ | 82.7 | $T_{NI}/°C$ | 86.4 |
| $\Delta n$ | 0.104 | $\Delta n$ | 0.107 | $\Delta n$ | 0.106 |
| no | 1.485 | no | 1.486 | no | 1.485 |
| $\epsilon_{//}$ | 3.5 | $\epsilon_{//}$ | 3.3 | $\epsilon_{//}$ | 3.3 |
| $\epsilon_{\perp}$ | 7.0 | $\epsilon_{\perp}$ | 6.3 | $\epsilon_{\perp}$ | 6.3 |
| $\Delta_{\epsilon}$ | -3.5 | $\Delta_{\epsilon}$ | -3.0 | $\Delta_{\epsilon}$ | -3.0 |
| $\eta$/mPa·s | 25.1 | $\eta$/mPa·s | 24.2 | $\eta$/mPa·s | 24.4 |
| $\gamma_1$/mPa·s | 141 | $\gamma_1$/mPa·s | 141 | $\gamma_1$/mPa·s | 142 |
| $\gamma_1/\Delta n^2 \times 10^{-2}$ | 131 | $\gamma_1/\Delta n^2 \times 10^{-2}$ | 123 | $\gamma_1/\Delta n^2 \times 10^{-2}$ | 126 |
| 3CyCy2 | 22% | 3CyCy2 | 24% | 3CyCy2 | 24% |
| 3CyPhO1 | 14% | 3CyCy4 | 5% | 3CyCy4 | 5% |
| 2CyPh5O2 | 7% | 3CyPhO1 | 6% | 3CyPhO1 | 6% |
| 3CyPh5O4 | 8% | 2CyPh5O2 | 5% | 2CyPh5O2 | 5% |
| 2CyPhPh5O2 | 7% | 3CyPh5O4 | 5% | 3CyPh5O4 | 5% |
| 3CyPhPh5O2 | 9% | 2CyPhPh5O2 | 7% | 2CyPhPh5O2 | 7% |
| 3CyCyPh5O3 | 8% | 3CyPhPh5O2 | 9% | 3CyPhPh5O2 | 9% |
| 4CyCyPh5O2 | 9% | 3CyCyPh5O3 | 8% | 3CyCyPh5O3 | 8% |
| 5CyCyPh5O2 | 8% | 4CyCyPh5O2 | 9% | 4CyCyPh5O2 | 9% |
| 3PhPh5Ph2 | 4% | 5CyCyPh5O2 | 8% | 5CyCyPh5O2 | 8% |
| 4PhPh5Ph2 | 4% | 3PhPh5Ph2 | 5% | 3PhPh5Ph2 | 5% |
|  |  | 4PhPh5Ph2 | 5% | 4PhPh5Ph2 | 5% |
|  |  | 5PhPh1 | 4% | 5PhPh1 | 2% |
|  |  |  |  | 3CyCyPh1 | 2% |

TABLE 29

|  | Example 73 | Example 74 | Example 75 | Example 76 |
|---|---|---|---|---|
| Liquid crystal composition | Liquid crystal composition 19 | Liquid crystal composition 19 | Liquid crystal composition 19 | Liquid crystal composition 19 |
| Color filter | Color filter 1 | Color filter 2 | Color filter 3 | Color filter 4 |
| VHR | 99.0 | 99.3 | 99.6 | 99.4 |
| ID | 99 | 61 | 19 | 33 |
| Image sticking | B | A | A | A |

TABLE 30

|  | Example 77 | Example 78 | Example 79 | Example 80 |
|---|---|---|---|---|
| Liquid crystal composition | Liquid crystal composition 20 | Liquid crystal composition 20 | Liquid crystal composition 20 | Liquid crystal composition 20 |
| Color filter | Color filter 1 | Color filter 2 | Color filter 3 | Color filter 4 |
| VHR | 99.1 | 99.4 | 99.7 | 99.5 |
| ID | 72 | 39 | 14 | 21 |
| Image sticking | B | A | A | A |

TABLE 31

|  | Example 81 | Example 82 | Example 83 | Example 84 |
|---|---|---|---|---|
| Liquid crystal composition | Liquid crystal composition 21 | Liquid crystal composition 21 | Liquid crystal composition 21 | Liquid crystal composition 21 |
| Color filter | Color filter 1 | Color filter 2 | Color filter 3 | Color filter 4 |
| VHR | 98.9 | 99.3 | 99.4 | 99.4 |
| ID | 96 | 66 | 35 | 44 |
| Image sticking | B | B | A | A |

In the liquid crystal display devices of Examples 73 to 84, high VHRs and low IDs were achieved. In the evaluation of image sticking, no residual image was observed or a residual image was slightly observed, which was at an acceptable level.

Examples 85 to 96

Liquid crystal compositions listed in Table 32 were sandwiched as in Example 1. Liquid crystal display devices of Examples 85 to 96 were produced using the color filters listed in Table 1 and the VHR and ID were measured. The image sticking of the liquid crystal display devices was also evaluated. Tables 33 to 35 show the results.

TABLE 32

| | Liquid crystal composition 22 | | Liquid crystal composition 23 | | Liquid crystal composition 24 |
|---|---|---|---|---|---|
| $T_{NI}/°C$ | 75.5 | $T_{NI}/°C$ | 80.3 | $T_{NI}/°C$ | 85.0 |
| $\Delta n$ | 0.102 | $\Delta n$ | 0.101 | $\Delta n$ | 0.102 |
| no | 1.484 | no | 1.484 | no | 1.484 |
| $\epsilon_{//}$ | 3.3 | $\epsilon_{//}$ | 3.3 | $\epsilon_{//}$ | 3.3 |
| $\epsilon_\perp$ | 6.1 | $\epsilon_\perp$ | 6.2 | $\epsilon_\perp$ | 6.2 |
| $\Delta\epsilon$ | −2.8 | $\Delta\epsilon$ | −2.9 | $\Delta\epsilon$ | −3.0 |
| $\eta/mPa \cdot s$ | 22.2 | $\eta/mPa \cdot s$ | 22.0 | $\eta/mPa \cdot s$ | 22.7 |
| $\gamma_1/mPa \cdot s$ | 121 | $\gamma_1/mPa \cdot s$ | 118 | $\gamma_1/mPa \cdot s$ | 122 |
| $\gamma_1/\Delta n^2 \times 10^{-2}$ | 117 | $\gamma_1/\Delta n^2 \times 10^{-2}$ | 117 | $\gamma_1/\Delta n^2 \times 10^{-2}$ | 118 |
| 3CyCy2 | 14% | 3CyCy2 | 17% | 3CyCy2 | 16% |
| 3CyCy4 | 12% | 3CyCy4 | 12% | 3CyCy4 | 12% |
| 3CyCy5 | 5% | 3CyCy5 | 5% | 3CyCy5 | 5% |
| 3CyPhO1 | 7% | 3CyPhO1 | 6% | 3CyPhO1 | 5% |
| 2CyPh5O2 | 7% | 2CyPh5O2 | 12% | 2CyPh5O2 | 12% |
| 3CyPh5O4 | 7% | 2CyPhPh5O2 | 9% | 2CyPhPh5O2 | 9% |
| 2CyPhPh5O2 | 8% | 3CyPhPh5O2 | 9% | 3CyPhPh5O2 | 9% |
| 3CyPhPh5O2 | 8% | 3CyCyPh5O3 | 6% | 3CyCyPh5O3 | 6% |
| 3CyCyPh5O3 | 6% | 4CyCyPh5O2 | 8% | 4CyCyPh5O2 | 8% |
| 4CyCyPh5O2 | 7% | 5CyCyPh5O2 | 6% | 5CyCyPh5O2 | 6% |
| 5CyCyPh5O2 | 6% | 3PhPh5Ph2 | 3% | 3PhPh5Ph2 | 3% |
| 3PhPh5Ph2 | 3% | 4PhPh5Ph2 | 3% | 4PhPh5Ph2 | 3% |
| 4PhPh5Ph2 | 3% | 5PhPh1 | 4% | 5PhPh1 | 3% |
| 5PhPh1 | 6% | | | 3CyCyPh1 | 3% |
| 3CyCyPh1 | 1% | | | | |

TABLE 33

| | Example 85 | Example 86 | Example 87 | Example 88 |
|---|---|---|---|---|
| Liquid crystal composition | Liquid crystal composition 22 | Liquid crystal composition 22 | Liquid crystal composition 22 | Liquid crystal composition 22 |
| Color filter | Color filter 1 | Color filter 2 | Color filter 3 | Color filter 4 |
| VHR | 99.0 | 99.3 | 99.5 | 99.4 |
| ID | 87 | 62 | 28 | 39 |
| Image sticking | B | B | A | A |

TABLE 34

| | Example 89 | Example 90 | Example 91 | Example 92 |
|---|---|---|---|---|
| Liquid crystal composition | Liquid crystal composition 23 | Liquid crystal composition 23 | Liquid crystal composition 23 | Liquid crystal composition 23 |
| Color filter | Color filter 1 | Color filter 2 | Color filter 3 | Color filter 4 |
| VHR | 99.0 | 99.3 | 99.5 | 99.3 |
| ID | 101 | 65 | 35 | 60 |
| Image sticking | B | A | A | A |

TABLE 35

| | Example 93 | Example 94 | Example 95 | Example 96 |
|---|---|---|---|---|
| Liquid crystal composition | Liquid crystal composition 24 | Liquid crystal composition 24 | Liquid crystal composition 24 | Liquid crystal composition 24 |
| Color filter | Color filter 1 | Color filter 2 | Color filter 3 | Color filter 4 |
| VHR | 99.2 | 99.5 | 99.8 | 99.6 |
| ID | 69 | 34 | 12 | 22 |
| Image sticking | A | A | A | A |

In the liquid crystal display devices of Examples 85 to 96, high VHRs and low IDs were achieved. In the evaluation of image sticking, no residual image was observed or a residual image was slightly observed, which was at an acceptable level.

Examples 97 to 108

Liquid crystal compositions listed in Table 36 were sandwiched as in Example 1. Liquid crystal display devices of Examples 97 to 108 were produced using the color filters listed in Table 1 and the VHR and ID were measured. The image sticking of the liquid crystal display devices was also evaluated. Tables 37 to 39 show the results.

TABLE 36

| | Liquid crystal composition 25 | | Liquid crystal composition 26 | | Liquid crystal composition 27 |
|---|---|---|---|---|---|
| $T_{NI}/°C$ | 75.6 | $T_{NI}/°C$ | 81.1 | $T_{NI}/°C$ | 85.7 |
| $\Delta n$ | 0.104 | $\Delta n$ | 0.105 | $\Delta n$ | 0.105 |
| no | 1.484 | no | 1.484 | no | 1.484 |
| $\epsilon_{//}$ | 3.3 | $\epsilon_{//}$ | 3.3 | $\epsilon_{//}$ | 3.2 |
| $\epsilon_\perp$ | 6.1 | $\epsilon_\perp$ | 6.1 | $\epsilon_\perp$ | 6.1 |
| $\Delta\epsilon$ | −2.8 | $\Delta\epsilon$ | −2.8 | $\Delta\epsilon$ | −2.9 |
| $\eta/mPa \cdot s$ | 20.2 | $\eta/mPa \cdot s$ | 20.8 | $\eta/mPa \cdot s$ | 21.0 |
| $\gamma_1/mPa \cdot s$ | 117 | $\gamma_1/mPa \cdot s$ | 119 | $\gamma_1/mPa \cdot s$ | 92 |
| $\gamma_1/\Delta n^2 \times 10^{-2}$ | 107 | $\gamma_1/\Delta n^2 \times 10^{-2}$ | 107 | $\gamma_1/\Delta n^2 \times 10^{-2}$ | 82 |
| 3CyCy2 | 25% | 3CyCy2 | 25% | 3CyCy2 | 25% |
| 3CyCy4 | 10% | 3CyCy4 | 10% | 3CyCy4 | 12% |
| 3CyPhO1 | 4% | 3CyPhO1 | 4% | 2CyPh5O2 | 12% |
| 2CyPh5O2 | 7% | 2CyPh5O2 | 12% | 2CyPhPh5O2 | 5% |
| 3CyPh5O4 | 8% | 2CyPhPh5O2 | 5% | 3CyPhPh5O2 | 6% |
| 2CyPhPh5O2 | 5% | 3CyPhPh5O2 | 6% | 3CyCyPh5O3 | 7% |

TABLE 36-continued

| Liquid crystal composition 25 | | Liquid crystal composition 26 | | Liquid crystal composition 27 | |
|---|---|---|---|---|---|
| 3CyPhPh5O2 | 6% | 3CyCyPh5O3 | 7% | 4CyCyPh5O2 | 8% |
| 3CyCyPh5O3 | 6% | 4CyCyPh5O2 | 8% | 5CyCyPh5O2 | 7% |
| 4CyCyPh5O2 | 7% | 5CyCyPh5O2 | 7% | 3PhPh5Ph2 | 8% |
| 5CyCyPh5O2 | 6% | 3PhPh5Ph2 | 8% | 4PhPh5Ph2 | 8% |
| 3PhPh5Ph2 | 8% | 4PhPh5Ph2 | 8% | 3CyCyPh1 | 2% |
| 4PhPh5Ph2 | 8% | | | | |

TABLE 37

| | Example 97 | Example 98 | Example 99 | Example 100 |
|---|---|---|---|---|
| Liquid crystal composition | Liquid crystal composition 25 | Liquid crystal composition 25 | Liquid crystal composition 25 | Liquid crystal composition 25 |
| Color filter | Color filter 1 | Color filter 2 | Color filter 3 | Color filter 4 |
| VHR | 99.2 | 99.5 | 99.8 | 99.6 |
| ID | 74 | 37 | 14 | 26 |
| Image sticking | B | A | A | A |

TABLE 38

| | Example 101 | Example 102 | Example 103 | Example 104 |
|---|---|---|---|---|
| Liquid crystal composition | Liquid crystal composition 26 | Liquid crystal composition 26 | Liquid crystal composition 26 | Liquid crystal composition 26 |
| Color filter | Color filter 1 | Color filter 2 | Color filter 3 | Color filter 4 |
| VHR | 99.1 | 99.3 | 99.6 | 99.5 |
| ID | 83 | 61 | 28 | 40 |
| Image sticking | B | A | A | A |

TABLE 39

| | Example 105 | Example 106 | Example 107 | Example 108 |
|---|---|---|---|---|
| Liquid crystal composition | Liquid crystal composition 27 | Liquid crystal composition 27 | Liquid crystal composition 27 | Liquid crystal composition 27 |
| Color filter | Color filter 1 | Color filter 2 | Color filter 3 | Color filter 4 |
| VHR | 99.0 | 99.3 | 99.6 | 99.4 |
| ID | 82 | 58 | 21 | 40 |
| Image sticking | A | B | A | A |

In the liquid crystal display devices of Examples 97 to 108, high VHRs and low IDs were achieved. In the evaluation of image sticking, no residual image was observed or a residual image was slightly observed, which was at an acceptable level.

Examples 109 to 112

A liquid crystal composition 28 was prepared by mixing 0.3% by mass of 2-methyl-acrylic acid 4'-{2-[4-(2-acryloyloxyethyl)-phenoxycarbonyl]-ethyl}-biphenyl-4-yl ester with the liquid crystal composition 1. The liquid crystal composition 28 was set in the VA cell used in Example 1. A polymerization treatment was performed by performing irradiation with ultraviolet rays (3.0 J/cm$^2$) for 600 seconds while applying a driving voltage between electrodes. Liquid crystal display devices of Examples 109 to 112 were then produced using the color filters 1 to 4 listed in Table 1 and the VHR and ID were measured. The image sticking of the liquid crystal display devices was also evaluated. Table 40 shows the results.

TABLE 40

| | Example 109 | Example 110 | Example 111 | Example 112 |
|---|---|---|---|---|
| Liquid crystal composition | Liquid crystal composition 28 | Liquid crystal composition 28 | Liquid crystal composition 28 | Liquid crystal composition 28 |
| Color filter | Color filter 1 | Color filter 2 | Color filter 3 | Color filter 4 |
| VHR | 98.8 | 99.3 | 99.4 | 99.3 |
| ID | 99 | 54 | 29 | 48 |
| Image sticking | B | B | A | A |

In the liquid crystal display devices of Examples 109 to 112, high VHRs and low IDs were achieved. In the evaluation of image sticking, no residual image was observed or a residual image was slightly observed, which was at an acceptable level.

Examples 113 to 116

A liquid crystal composition 29 was prepared by mixing 0.3% by mass of bismethacrylic acid biphenyl-4,4'-diyl with the liquid crystal composition 13. The liquid crystal composition 29 was set in the VA cell used in Example 1. A polymerization treatment was performed by performing irradiation with ultraviolet rays (3.0 J/cm$^2$) for 600 seconds while applying a driving voltage between electrodes. Liquid crystal display devices of Examples 113 to 116 were then produced using the color filters 1 to 4 listed in Table 1 and the VHR and ID were measured. The image sticking of the liquid crystal display devices was also evaluated. Table 41 shows the results.

TABLE 41

| | Example 113 | Example 114 | Example 115 | Example 116 |
|---|---|---|---|---|
| Liquid crystal composition | Liquid crystal composition 29 | Liquid crystal composition 29 | Liquid crystal composition 29 | Liquid crystal composition 29 |
| Color filter | Color filter 1 | Color filter 2 | Color filter 3 | Color filter 4 |
| VHR | 99.0 | 99.3 | 99.5 | 99.4 |
| ID | 87 | 59 | 22 | 40 |
| Image sticking | B | B | A | A |

In the liquid crystal display devices of Examples 113 to 116, high VHRs and low IDs were achieved. In the evaluation of image sticking, no residual image was observed or a residual image was slightly observed, which was at an acceptable level.

Examples 117 to 120

A liquid crystal composition 30 was prepared by mixing 0.3% by mass of bismethacrylic acid 3-fluorobiphenyl-4,4'-diyl with the liquid crystal composition 19. The liquid crystal composition 30 was set in the VA cell used in Example 1. A polymerization treatment was performed by performing irradiation with ultraviolet rays (3.0 J/cm²) for 600 seconds while applying a driving voltage between electrodes. Liquid crystal display devices of Examples 117 to 120 were then produced using the color filters 1 to 4 listed in Table 1 and the VHR and ID were measured. The image sticking of the liquid crystal display devices was also evaluated. Table 42 shows the results.

TABLE 42

|  | Example 117 | Example 118 | Example 119 | Example 120 |
| --- | --- | --- | --- | --- |
| Liquid crystal composition | Liquid crystal composition 30 | Liquid crystal composition 30 | Liquid crystal composition 30 | Liquid crystal composition 30 |
| Color filter | Color filter 1 | Color filter 2 | Color filter 3 | Color filter 4 |
| VHR | 98.9 | 99.3 | 99.5 | 99.3 |
| ID | 92 | 55 | 22 | 46 |
| Image sticking | B | A | A | A |

In the liquid crystal display devices of Examples 117 to 120, high VHRs and low IDs were achieved. In the evaluation of image sticking, no residual image was observed or a residual image was slightly observed, which was at an acceptable level.

Comparative Examples 1 to 4

A comparative liquid crystal composition 1 described below was set in the VA cell used in Example 1. Table 43 shows the physical properties of the comparative liquid crystal composition. Liquid crystal display devices of Comparative Examples 1 to 4 were produced using the color filters 1 to 4 listed in Table 1 and the VHR and ID were measured. The image sticking of the liquid crystal display devices was also evaluated. Table 44 shows the results.

Comparative liquid crystal composition 1

[Chem. 19]

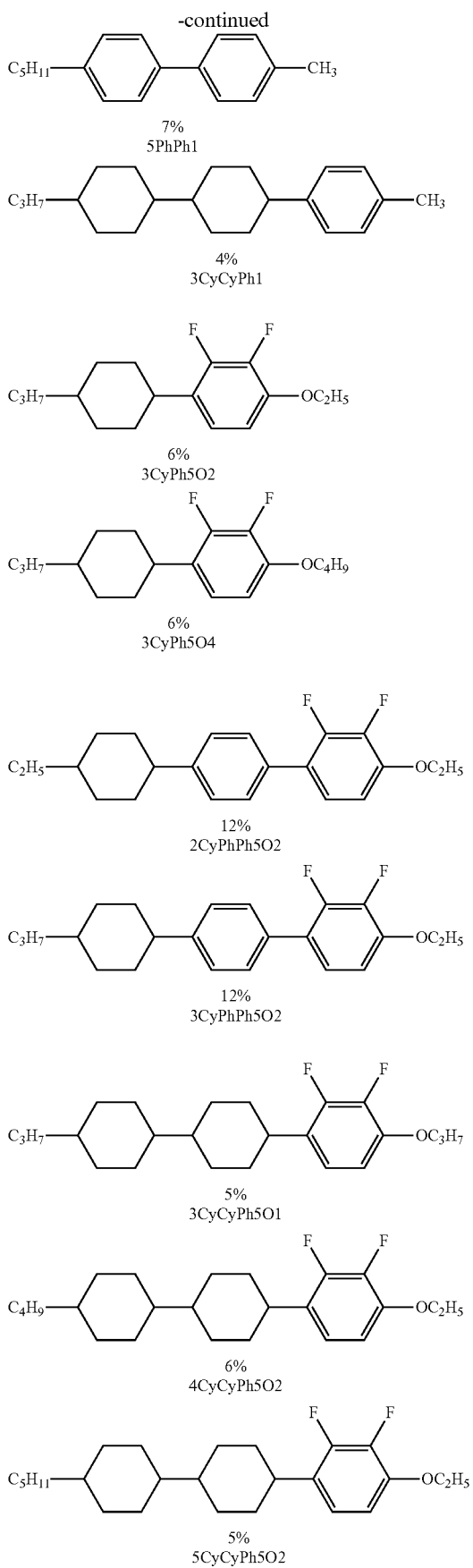

TABLE 43

Comparative liquid crystal composition 1

| | |
|---|---|
| $T_{NI}/°C$ | 81.4 |
| $\Delta n$ | 0.101 |
| $n_o$ | 1.484 |
| $\epsilon_{//}$ | 3.23 |
| $\epsilon_{\perp}$ | 6.09 |
| $\Delta \epsilon$ | −2.86 |
| $\eta/mPa \cdot s$ | 22.6 |
| $\gamma_1/mPa \cdot s$ | 122 |
| $\gamma_1/\Delta n^2 \times 10^{-2}$ | 120 |

TABLE 44

| | Comparative Example 1 | Comparative Example 2 | Comparative Example 3 | Comparative Example 4 |
|---|---|---|---|---|
| Liquid crystal composition | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 98.2 | 98.2 | 98.5 | 98.2 |
| ID | 165 | 149 | 143 | 145 |
| Image sticking | D | D | C | D |

In the liquid crystal display devices of Comparative Examples 1 to 4, the VHRs were decreased and the IDs were increased compared with the liquid crystal display devices of the present invention. In the evaluation of image sticking, a residual image was observed, which was at an unacceptable level.

Comparative Examples 5 to 12

Comparative liquid crystal compositions listed in Table 45 were sandwiched as in Example 1. Liquid crystal display devices of Comparative Examples 5 to 12 were produced using the color filters 1 to 4 listed in Table 1 and the VHR and ID were measured. The image sticking of the liquid crystal display devices was also evaluated. Tables 46 and 47 show the results.

TABLE 45

| Comparative liquid crystal composition 2 | | Comparative liquid crystal composition 3 | |
|---|---|---|---|
| $T_{NI}/°C$ | 74.4 | $T_{NI}/°C$ | 85.0 |
| $\Delta n$ | 0.102 | $\Delta n$ | 0.100 |
| $n_o$ | 1.484 | $n_o$ | 1.484 |
| $\epsilon_{//}$ | 3.23 | $\epsilon_{//}$ | 3.21 |
| $\epsilon_{\perp}$ | 6.11 | $\epsilon_{\perp}$ | 6.11 |
| $\Delta \epsilon$ | −2.87 | $\Delta \epsilon$ | −2.91 |
| $\eta/mPa \cdot s$ | 21.9 | $\eta/mPa \cdot s$ | 22.7 |
| $\gamma_1/mPa \cdot s$ | 117 | $\gamma_1/mPa \cdot s$ | 123 |
| $\gamma_1/\Delta n^2 \times 10^{-2}$ | 113 | $\gamma_1/\Delta n^2 \times 10^{-2}$ | 123 |
| 3CyCy2 | 18% | 3CyCy2 | 15% |

TABLE 45-continued

| Comparative liquid crystal composition 2 | | Comparative liquid crystal composition 3 | |
|---|---|---|---|
| 3CyCy4 | 12% | 3CyCy4 | 12% |
| 3CyCy5 | 5% | 3CyCy5 | 5% |
| 2CyPh5O2 | 6% | 3CyPh5O1 | 5% |
| 3CyPh5O4 | 7% | 2CyPh5O2 | 6% |
| 2CyPhPh5O2 | 12% | 3CyPh5O4 | 6% |
| 3CyPhPh5O2 | 12% | 2CyPhPh5O2 | 12% |
| 3CyCyPh5O3 | 5% | 3CyPhPh5O2 | 12% |
| 4CyCyPh5O2 | 6% | 3CyCyPh5O3 | 5% |
| 5CyCyPh5O2 | 5% | 4CyCyPh5O2 | 6% |
| 5PhPh1 | 12% | 5CyCyPh5O2 | 5% |
| | | 5PhPh1 | 5% |
| | | 3CyCyPh1 | 6% |

TABLE 46

| | Comparative Example 5 | Comparative Example 6 | Comparative Example 7 | Comparative Example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.0 | 98.1 | 98.4 | 98.3 |
| ID | 176 | 149 | 146 | 146 |
| Image sticking | D | D | D | D |

TABLE 47

| | Comparative Example 9 | Comparative Example 10 | Comparative Example 11 | Comparative Example 12 |
|---|---|---|---|---|
| Liquid crystal composition | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 |
| VHR | 98.1 | 98.3 | 98.4 | 98.4 |
| ID | 164 | 145 | 131 | 137 |
| Image sticking | D | D | C | D |

In the liquid crystal display devices of Comparative Examples 5 to 12, the VHRs were decreased and the IDs were increased compared with the liquid crystal display devices of the present invention. In the evaluation of image sticking, a residual image was observed, which was at an unacceptable level.

Comparative Examples 13 to 24

Comparative liquid crystal compositions listed in Table 48 were sandwiched as in Example 1. Liquid crystal display devices of Comparative Examples 13 to 24 were produced using the color filters 1 to 4 listed in Table 1 and the VHR and ID were measured. The image sticking of the liquid crystal display devices was also evaluated. Tables 49 to 51 show the results.

TABLE 48

| Comparative liquid crystal composition 4 | | Comparative liquid crystal composition 5 | | Comparative liquid crystal composition 6 | |
|---|---|---|---|---|---|
| $T_{NI}/°C$ | 77.5 | $T_{NI}/°C$ | 80.8 | $T_{NI}/°C$ | 85.6 |
| $\Delta n$ | 0.117 | $\Delta n$ | 0.114 | $\Delta n$ | 0.115 |
| $n_o$ | 1.489 | $n_o$ | 1.488 | $n_o$ | 1.488 |

TABLE 48-continued

| | Comparative liquid crystal composition 4 | | Comparative liquid crystal composition 5 | | Comparative liquid crystal composition 6 |
|---|---|---|---|---|---|
| $\epsilon_{//}$ | 3.30 | $\epsilon_{//}$ | 3.29 | $\epsilon_{//}$ | 3.25 |
| $\epsilon_{\perp}$ | 5.79 | $\epsilon_{\perp}$ | 5.83 | $\epsilon_{\perp}$ | 5.83 |
| $\Delta\epsilon$ | −2.49 | $\Delta\epsilon$ | −2.54 | $\Delta\epsilon$ | −2.59 |
| $\eta$/mPa·s | 21.6 | $\eta$/mPa·s | 21.2 | $\eta$/mPa·s | 21.8 |
| $\gamma_1$/mPa·s | 130 | $\gamma_1$/mPa·s | 128 | $\gamma_1$/mPa·s | 131 |
| $\gamma_1/\Delta n^2 \times 10^{-2}$ | 94 | $\gamma_1/\Delta n^2 \times 10^{-2}$ | 98 | $\gamma_1/\Delta n^2 \times 10^{-2}$ | 98 |
| 3CyCy2 | 25% | 3CyCy2 | 25% | 3CyCy2 | 25% |
| 3CyCy4 | 6% | 3CyCy4 | 7% | 3CyCy4 | 7% |
| 3CyPhO1 | 4% | 3CyPhO1 | 6% | 3CyPhO1 | 3% |
| 2CyPh5O2 | 10% | 2CyPh5O2 | 10% | 2CyPh5O2 | 10% |
| 2CyPhPh5O2 | 5% | 2CyPhPh5O2 | 5% | 2CyPhPh5O2 | 5% |
| 3CyPhPh5O2 | 6% | 3CyPhPh5O2 | 6% | 3CyPhPh5O2 | 6% |
| 3CyCyPh5O3 | 6% | 3CyCyPh5O3 | 6% | 3CyCyPh5O3 | 6% |
| 4CyCyPh5O2 | 7% | 4CyCyPh5O2 | 7% | 4CyCyPh5O2 | 7% |
| 5CyCyPh5O2 | 6% | 5CyCyPh5O2 | 6% | 5CyCyPh5O2 | 6% |
| 3PhPh5Ph2 | 10% | 3PhPh5Ph2 | 10% | 3PhPh5Ph2 | 10% |
| 4PhPh5Ph2 | 11% | 4PhPh5Ph2 | 11% | 4PhPh5Ph2 | 11% |
| 5PhPh1 | 4% | 3CyCyPh1 | 1% | 3CyCyPh1 | 4% |

TABLE 49

| | Comparative Example 13 | Comparative Example 14 | Comparative Example 15 | Comparative Example 16 |
|---|---|---|---|---|
| Liquid crystal composition | Comparative liquid crystal composition 4 | Comparative liquid crystal composition 4 | Comparative liquid crystal composition 4 | Comparative liquid crystal composition 4 |
| Color filter | Color filter 1 | Color filter 2 | Color filter 3 | Color filter 4 |
| VHR | 97.9 | 98.1 | 98.4 | 98.3 |
| ID | 175 | 148 | 146 | 146 |
| Image sticking | D | D | D | D |

TABLE 50

| | Comparative Example 17 | Comparative Example 18 | Comparative Example 19 | Comparative Example 20 |
|---|---|---|---|---|
| Liquid crystal composition | Comparative liquid crystal composition 5 | Comparative liquid crystal composition 5 | Comparative liquid crystal composition 5 | Comparative liquid crystal composition 5 |
| Color filter | Color filter 1 | Color filter 2 | Color filter 3 | Color filter 4 |
| VHR | 98.0 | 98.2 | 98.4 | 98.4 |
| ID | 162 | 140 | 132 | 136 |
| Image sticking | D | D | C | D |

TABLE 51

| | Comparative Example 21 | Comparative Example 22 | Comparative Example 23 | Comparative Example 24 |
|---|---|---|---|---|
| Liquid crystal composition | Comparative liquid crystal composition 6 | Comparative liquid crystal composition 6 | Comparative liquid crystal composition 6 | Comparative liquid crystal composition 6 |
| Color filter | Color filter 1 | Color filter 2 | Color filter 3 | Color filter 4 |
| VHR | 98.0 | 98.3 | 98.4 | 98.4 |
| ID | 166 | 144 | 131 | 136 |
| Image sticking | D | D | C | D |

In the liquid crystal display devices of Comparative Examples 13 to 24, the VHRs were decreased and the IDs were increased compared with the liquid crystal display devices of the present invention. In the evaluation of image sticking, a residual image was observed, which was at an unacceptable level.

Comparative Examples 25 to 36

Comparative liquid crystal compositions listed in Table 52 were sandwiched as in Example 1. Liquid crystal display devices of Comparative Examples 25 to 36 were produced using the color filters 1 to 4 listed in Table 1 and the VHR and ID were measured. The image sticking of the liquid crystal display devices was also evaluated. Tables 53 to 55 show the results.

TABLE 52

| | Comparative liquid crystal composition 7 | | Comparative liquid crystal composition 8 | | Comparative liquid crystal composition 9 |
|---|---|---|---|---|---|
| $T_{NI}$/°C. | 75.5 | $T_{NI}$/°C. | 80.7 | $T_{NI}$/°C. | 85.8 |
| $\Delta n$ | 0.104 | $\Delta n$ | 0.104 | $\Delta n$ | 0.104 |
| no | 1.485 | no | 1.485 | no | 1.485 |
| $\epsilon_{//}$ | 3.26 | $\epsilon_{//}$ | 3.22 | $\epsilon_{//}$ | 3.21 |
| $\epsilon_{\perp}$ | 6.14 | $\epsilon_{\perp}$ | 6.10 | $\epsilon_{\perp}$ | 6.16 |
| $\Delta\epsilon$ | −2.88 | $\Delta\epsilon$ | −2.88 | $\Delta\epsilon$ | −2.95 |
| $\eta$/mPa·s | 22.5 | $\eta$/mPa·s | 22.3 | $\eta$/mPa·s | 22.4 |
| $\gamma_1$/mPa·s | 123 | $\gamma_1$/mPa·s | 122 | $\gamma_1$/mPa·s | 124 |
| $\gamma_1/\Delta n^2 \times 10^{-2}$ | 114 | $\gamma_1/\Delta n^2 \times 10^{-2}$ | 113 | $\gamma_1/\Delta n^2 \times 10^{-2}$ | 114 |
| 3CyCy2 | 24% | 3CyCy2 | 24% | 3CyCy2 | 24% |
| 3CyCy4 | 4% | 3CyCy4 | 4% | 3CyCy4 | 4% |
| 3CyPh5O2 | 7% | 3CyPh5O2 | 7% | 3CyPh5O2 | 7% |
| 3CyPh5O4 | 8% | 3CyPh5O4 | 8% | 3CyPh5O4 | 8% |
| 2CyPhPh5O2 | 4% | 2CyPhPh5O2 | 5% | 2CyPhPh5O2 | 6% |

TABLE 52-continued

| Comparative liquid crystal composition 7 | | Comparative liquid crystal composition 8 | | Comparative liquid crystal composition 9 | |
|---|---|---|---|---|---|
| 3CyPhPh5O2 | 5% | 3CyPhPh5O2 | 6% | 3CyPhPh5O2 | 7% |
| 3CyCyPh5O3 | 8% | 3CyCyPh5O3 | 7% | 3CyCyPh5O3 | 7% |
| 4CyCyPh5O2 | 10% | 4CyCyPh5O2 | 9% | 4CyCyPh5O2 | 7% |
| 5CyCyPh5O2 | 8% | 5CyCyPh5O2 | 7% | 5CyCyPh5O2 | 7% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |
| 5PhPh1 | 10% | 5PhPh1 | 7% | 5PhPh1 | 4% |
| 3CyCyPh1 | 4% | 3CyCyPh1 | 8% | 3CyCyPh1 | 11% |

TABLE 53

| | Comparative Example 25 | Comparative Example 26 | Comparative Example 27 | Comparative Example 28 |
|---|---|---|---|---|
| Liquid crystal composition | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 |
| VHR | 97.8 | 98.0 | 98.3 | 98.3 |
| ID | 175 | 160 | 145 | 146 |
| Image sticking | D | D | D | D |

TABLE 54

| | Comparative Example 29 | Comparative Example 30 | Comparative Example 31 | Comparative Example 32 |
|---|---|---|---|---|
| Liquid crystal composition | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 |
| VHR | 98.1 | 98.3 | 98.4 | 98.4 |
| ID | 167 | 149 | 131 | 136 |
| Image sticking | D | D | C | D |

TABLE 55

| | Comparative Example 33 | Comparative Example 34 | Comparative Example 35 | Comparative Example 36 |
|---|---|---|---|---|
| Liquid crystal composition | Comparative liquid crystal composition 9 | Comparative liquid crystal composition 9 | Comparative liquid crystal composition 9 | Comparative liquid crystal composition 9 |
| Color filter | Color filter 1 | Color filter 2 | Color filter 3 | Color filter 4 |
| VHR | 98.0 | 98.2 | 98.4 | 98.5 |
| ID | 170 | 152 | 131 | 136 |
| Image sticking | C | D | C | D |

In the liquid crystal display devices of Comparative Examples 25 to 36, the VHRs were decreased and the IDs were increased compared with the liquid crystal display devices of the present invention. In the evaluation of image sticking, a residual image was observed, which was at an unacceptable level.

Comparative Examples 37 to 48

Comparative liquid crystal compositions listed in Table 56 were sandwiched as in Example 1. Liquid crystal display devices of Comparative Examples 37 to 48 were produced using the color filters 1 to 4 listed in Table 1 and the VHR and ID were measured. The image sticking of the liquid crystal display devices was also evaluated. Tables 57 to 59 show the results.

TABLE 56

| Comparative liquid crystal composition 10 | | Comparative liquid crystal composition 11 | | Comparative liquid crystal composition 12 | |
|---|---|---|---|---|---|
| $T_{NI}/°C$ | 73.6 | $T_{NI}/°C$ | 80.9 | $T_{NI}/°C$ | 84.7 |
| $\Delta n$ | 0.099 | $\Delta n$ | 0.094 | $\Delta n$ | 0.085 |
| no | 1.484 | no | 1.480 | no | 1.477 |
| $\epsilon_{//}$ | 3.21 | $\epsilon_{//}$ | 3.07 | $\epsilon_{//}$ | 3.00 |
| $\epsilon_\perp$ | 5.36 | $\epsilon_\perp$ | 5.23 | $\epsilon_\perp$ | 5.13 |
| $\Delta\epsilon$ | −2.15 | $\Delta\epsilon$ | −2.16 | $\Delta\epsilon$ | −2.13 |
| $\eta$/mPa·s | 17.7 | $\eta$/mPa·s | 17.0 | $\eta$/mPa·s | 17.5 |
| $\gamma_1$/mPa·s | 104 | $\gamma_1$/mPa·s | 97 | $\gamma_1$/mPa·s | 98 |
| $\gamma_1/\Delta n^2 \times 10^{-2}$ | 106 | $\gamma_1/\Delta n^2 \times 10^{-2}$ | 109 | $\gamma_1/\Delta n^2 \times 10^{-2}$ | 136 |
| 3CyCy2 | 20% | 3CyCy2 | 24% | 3CyCy2 | 21% |
| 3CyCy4 | 12% | 3CyCy4 | 12% | 3CyCy4 | 15% |
| 3CyCy5 | 7% | 3CyCy5 | 15% | 3CyCy5 | 15% |
| 3CyPhO1 | 12% | 3CyPh5O2 | 5% | 3CyPh5O2 | 5% |
| 3CyPh5O2 | 5% | 3CyPh5O4 | 5% | 3CyPh5O4 | 5% |
| 3CyPh5O4 | 5% | 2CyPhPh5O2 | 11% | 2CyPhPh5O2 | 4% |
| 2CyPhPh5O2 | 11% | 3CyPhPh5O2 | 11% | 3CyPhPh5O2 | 5% |
| 3CyPhPh5O2 | 11% | 3CyCyPh5O3 | 3% | 3CyCyPh5O3 | 7% |
| 3CyCyPh5O3 | 3% | 4CyCyPh5O2 | 3% | 4CyCyPh5O2 | 8% |
| 4CyCyPh5O2 | 3% | 5CyCyPh5O2 | 3% | 5CyCyPh5O2 | 7% |
| 5CyCyPh5O2 | 3% | 3PhPh5Ph2 | 4% | 3PhPh5Ph2 | 4% |
| 3PhPh5Ph2 | 4% | 4PhPh5Ph2 | 4% | 4PhPh5Ph2 | 4% |
| 4PhPh5Ph2 | 4% | | | | |

TABLE 57

|  | Comparative Example 37 | Comparative Example 38 | Comparative Example 39 | Comparative Example 40 |
|---|---|---|---|---|
| Liquid crystal composition | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 |
| VHR | 97.9 | 98.1 | 98.5 | 98.3 |
| ID | 181 | 163 | 147 | 153 |
| Image sticking | D | D | D | D |

TABLE 58

|  | Comparative Example 41 | Comparative Example 42 | Comparative Example 43 | Comparative Example 44 |
|---|---|---|---|---|
| Liquid crystal composition | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 |

TABLE 58-continued

|  | Comparative Example 41 | Comparative Example 42 | Comparative Example 43 | Comparative Example 44 |
|---|---|---|---|---|
| VHR | 98.1 | 98.3 | 98.5 | 98.4 |
| ID | 163 | 153 | 132 | 136 |
| Image sticking | D | D | C | D |

TABLE 59

|  | Comparative Example 45 | Comparative Example 46 | Comparative Example 47 | Comparative Example 48 |
|---|---|---|---|---|
| Liquid crystal composition | Comparative liquid crystal composition 12 | Comparative liquid crystal composition 12 | Comparative liquid crystal composition 12 | Comparative liquid crystal composition 12 |

TABLE 59-continued

|  | Comparative Example 45 | Comparative Example 46 | Comparative Example 47 | Comparative Example 48 |
|---|---|---|---|---|
| Color filter | Color filter 1 | Color filter 2 | Color filter 3 | Color filter 4 |
| VHR | 98.0 | 98.2 | 98.4 | 98.4 |
| ID | 162 | 149 | 131 | 137 |
| Image sticking | D | D | C | D |

In the liquid crystal display devices of Comparative Examples 37 to 48, the VHRs were decreased and the IDs were increased compared with the liquid crystal display devices of the present invention. In the evaluation of image sticking, a residual image was observed, which was at an unacceptable level.

Comparative Examples 49 to 60

Comparative liquid crystal compositions listed in Table 60 were sandwiched as in Example 1. Liquid crystal display devices of Comparative Examples 49 to 60 were produced using the color filters 1 to 4 listed in Table 1 and the VHR and ID were measured. The image sticking of the liquid crystal display devices was also evaluated. Tables 61 to 63 show the results.

TABLE 60

| | Comparative liquid crystal composition 13 | | Comparative liquid crystal composition 14 | | Comparative liquid crystal composition 15 |
|---|---|---|---|---|---|
| $T_{NI}/°C$ | 77.1 | $T_{NI}/°C$ | 80.8 | $T_{NI}/°C$ | 86.3 |
| $\Delta n$ | 0.109 | $\Delta n$ | 0.108 | $\Delta n$ | 0.107 |
| no | 1.489 | no | 1.488 | no | 1.487 |
| $\epsilon_{//}$ | 3.18 | $\epsilon_{//}$ | 3.18 | $\epsilon_{//}$ | 3.15 |
| $\epsilon_\perp$ | 5.29 | $\epsilon_\perp$ | 5.38 | $\epsilon_\perp$ | 5.42 |
| $\Delta\epsilon$ | -2.10 | $\Delta\epsilon$ | -2.20 | $\Delta\epsilon$ | -2.27 |
| $\eta/mPa \cdot s$ | 21.6 | $\eta/mPa \cdot s$ | 22.1 | $\eta/mPa \cdot s$ | 22.3 |
| $\gamma_1/mPa \cdot s$ | 130 | $\gamma_1/mPa \cdot s$ | 133 | $\gamma_1/mPa \cdot s$ | 134 |
| $\gamma_1/\Delta n^2 \times 10^{-2}$ | 109 | $\gamma_1/\Delta n^2 \times 10^{-2}$ | 114 | $\gamma_1/\Delta n^2 \times 10^{-2}$ | 118 |
| 3CyCy2 | 24% | 3CyCy2 | 24% | 3CyCy2 | 24% |
| 3CyCy4 | 7% | 3CyCy4 | 7% | 3CyCy4 | 7% |
| 3CyPhO1 | 5% | 3CyPhO1 | 5% | 3CyPhO1 | 5% |
| 2CyPh5O2 | 2% | 2CyPh5O2 | 2% | 2CyPh5O2 | 2% |
| 3CyPh5O4 | 2% | 3CyPh5O4 | 2% | 3CyPh5O4 | 2% |
| 2CyPhPh5O2 | 8% | 2CyPhPh5O2 | 8% | 2CyPhPh5O2 | 8% |
| 3CyPhPh5O2 | 8% | 3CyPhPh5O2 | 8% | 3CyPhPh5O2 | 8% |
| 3CyCyPh5O3 | 7% | 3CyCyPh5O3 | 8% | 3CyCyPh5O3 | 8% |
| 4CyCyPh5O2 | 9% | 4CyCyPh5O2 | 8% | 4CyCyPh5O2 | 8% |
| 5CyCyPh5O2 | 7% | 5CyCyPh5O2 | 8% | 5CyCyPh5O2 | 8% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |
| 5PhPh1 | 13% | 5PhPh1 | 11% | 5PhPh1 | 8% |
| | | 3CyCyPh1 | 1% | 3CyCyPh1 | 4% |

TABLE 61

|  | Comparative Example 49 | Comparative Example 50 | Comparative Example 51 | Comparative Example 52 |
|---|---|---|---|---|
| Liquid crystal composition | Comparative liquid crystal composition 13 | Comparative liquid crystal composition 13 | Comparative liquid crystal composition 13 | Comparative liquid crystal composition 13 |
| Color filter | Color filter 1 | Color filter 2 | Color filter 3 | Color filter 4 |
| VHR | 97.9 | 98.1 | 98.4 | 98.4 |
| ID | 175 | 162 | 145 | 147 |
| Image sticking | D | D | D | D |

TABLE 62

|  | Comparative Example 53 | Comparative Example 54 | Comparative Example 55 | Comparative Example 56 |
|---|---|---|---|---|
| Liquid crystal composition | Comparative liquid crystal composition 14 | Comparative liquid crystal composition 14 | Comparative liquid crystal composition 14 | Comparative liquid crystal composition 14 |
| Color filter | Color filter 1 | Color filter 2 | Color filter 3 | Color filter 4 |
| VHR | 98.0 | 98.2 | 98.5 | 98.4 |
| ID | 164 | 149 | 131 | 137 |
| Image sticking | D | D | C | D |

TABLE 63

|  | Comparative Example 57 | Comparative Example 58 | Comparative Example 59 | Comparative Example 60 |
|---|---|---|---|---|
| Liquid crystal composition | Comparative liquid crystal composition 15 | Comparative liquid crystal composition 15 | Comparative liquid crystal composition 15 | Comparative liquid crystal composition 15 |
| Color filter | Color filter 1 | Color filter 2 | Color filter 3 | Color filter 4 |
| VHR | 98.1 | 98.3 | 98.5 | 98.5 |
| ID | 168 | 152 | 131 | 137 |
| Image sticking | D | D | C | D |

In the liquid crystal display devices of Comparative Examples 49 to 60, the VHRs were decreased and the IDs were increased compared with the liquid crystal display devices of the present invention. In the evaluation of image sticking, a residual image was observed, which was at an unacceptable level.

Comparative Examples 61 to 72

Comparative liquid crystal compositions listed in Table 64 were sandwiched as in Example 1. Liquid crystal display devices of Comparative Examples 61 to 72 were produced using the color filters 1 to 4 listed in Table 1 and the VHR and ID were measured. The image sticking of the liquid crystal display devices was also evaluated. Tables 65 to 67 show the results.

TABLE 64

|  | Comparative liquid crystal composition 16 |  | Comparative liquid crystal composition 17 |  | Comparative liquid crystal composition 18 |
|---|---|---|---|---|---|
| $T_{NI}/°C.$ | 74.7 | $T_{NI}/°C.$ | 74.7 | $T_{NI}/°C.$ | 86.2 |
| $\Delta n$ | 0.104 | $\Delta n$ | 0.104 | $\Delta n$ | 0.102 |
| no | 1.483 | no | 1.483 | no | 1.480 |
| $\epsilon_{//}$ | 3.38 | $\epsilon_{//}$ | 3.38 | $\epsilon_{//}$ | 3.23 |
| $\epsilon_{\perp}$ | 6.85 | $\epsilon_{\perp}$ | 6.85 | $\epsilon_{\perp}$ | 6.73 |
| $\Delta\epsilon$ | −3.47 | $\Delta\epsilon$ | −3.47 | $\Delta\epsilon$ | −3.50 |
| $\eta/mPa \cdot s$ | 22.9 | $\eta/mPa \cdot s$ | 22.9 | $\eta/mPa \cdot s$ | 25.3 |
| $\gamma_1/mPa \cdot s$ | 121 | $\gamma_1/mPa \cdot s$ | 121 | $\gamma_1/mPa \cdot s$ | 127 |
| $\gamma_1/\Delta n^2 \times 10^{-2}$ | 112 | $\gamma_1/\Delta n^2 \times 10^{-2}$ | 112 | $\gamma_1/\Delta n^2 \times 10^{-2}$ | 123 |
| 3CyCy2 | 12% | 3CyCy2 | 12% | 3CyCy4 | 20% |
| 3CyCy4 | 12% | 3CyCy4 | 12% | 3CyCy5 | 15% |
| 3CyCy5 | 5% | 3CyCy5 | 5% | 2CyPh5O2 | 11% |
| 3CyPhO1 | 6% | 3CyPhO1 | 6% | 3CyPh5O4 | 11% |
| 2CyPh5O2 | 11% | 2CyPh5O2 | 11% | 2CyPhPh5O2 | 7% |
| 3CyPh5O4 | 11% | 3CyPh5O4 | 11% | 3CyPhPh5O2 | 8% |
| 2CyPhPh5O2 | 7% | 2CyPhPh5O2 | 7% | 3CyCyPh5O3 | 5% |
| 3CyPhPh5O2 | 8% | 3CyPhPh5O2 | 8% | 4CyCyPh5O2 | 5% |
| 3CyCyPh5O3 | 5% | 3CyCyPh5O3 | 5% | 5CyCyPh5O2 | 5% |
| 4CyCyPh5O2 | 5% | 4CyCyPh5O2 | 5% | 3PhPh5Ph2 | 4% |
| 5CyCyPh5O2 | 5% | 5CyCyPh5O2 | 5% | 4PhPh5Ph2 | 4% |
| 3PhPh5Ph2 | 5% | 3PhPh5Ph2 | 5% | 3CyCyPh1 | 5% |
| 4PhPh5Ph2 | 5% | 4PhPh5Ph2 | 5% |  |  |
| 3CyCyPh1 | 3% | 3CyCyPh1 | 3% |  |  |

TABLE 65

|  | Comparative Example 61 | Comparative Example 62 | Comparative Example 63 | Comparative Example 64 |
|---|---|---|---|---|
| Liquid crystal composition | Comparative liquid crystal composition 16 | Comparative liquid crystal composition 16 | Comparative liquid crystal composition 16 | Comparative liquid crystal composition 16 |
| Color filter | Color filter 1 | Color filter 2 | Color filter 3 | Color filter 4 |
| VHR | 97.9 | 98.1 | 98.3 | 98.3 |
| ID | 177 | 166 | 145 | 147 |
| Image sticking | D | D | D | D |

TABLE 66

|  | Comparative Example 65 | Comparative Example 66 | Comparative Example 67 | Comparative Example 68 |
|---|---|---|---|---|
| Liquid crystal composition | Comparative liquid crystal composition 17 | Comparative liquid crystal composition 17 | Comparative liquid crystal composition 17 | Comparative liquid crystal composition 17 |
| Color filter | Color filter 1 | Color filter 2 | Color filter 3 | Color filter 4 |
| VHR | 98.0 | 98.3 | 98.5 | 98.4 |
| ID | 164 | 144 | 132 | 136 |
| Image sticking | D | D | C | D |

TABLE 67

|  | Comparative Example 69 | Comparative Example 70 | Comparative Example 71 | Comparative Example 72 |
|---|---|---|---|---|
| Liquid crystal composition | Comparative liquid crystal composition 18 | Comparative liquid crystal composition 18 | Comparative liquid crystal composition 18 | Comparative liquid crystal composition 18 |
| Color filter | Color filter 1 | Color filter 2 | Color filter 3 | Color filter 4 |
| VHR | 98.0 | 98.4 | 98.3 | 98.4 |
| ID | 162 | 142 | 131 | 137 |
| Image sticking | D | D | D | D |

In the liquid crystal display devices of Comparative Examples 61 to 72, the VHRs were decreased and the IDs were increased compared with the liquid display devices of the present invention. In the evaluation of image sticking, a residual image was observed, which was at an unacceptable level.

Comparative Examples 73 to 84

Comparative liquid crystal compositions listed in Table 68 were sandwiched as in Example 1. Liquid crystal display devices of Comparative Examples 73 to 84 were produced using the color filters 1 to 4 listed in Table 1 and the VHR and ID were measured. The image sticking of the liquid crystal display devices was also evaluated. Tables 69 to 71 show the results.

TABLE 68

| | Comparative liquid crystal composition 19 | | Comparative liquid crystal composition 20 | | Comparative liquid crystal composition 21 |
|---|---|---|---|---|---|
| $T_{NI}$/° C. | 74.9 | $T_{NI}$/° C. | 79.6 | $T_{NI}$/° C. | 85.4 |
| $\Delta n$ | 0.103 | $\Delta n$ | 0.104 | $\Delta n$ | 0.107 |
| no | 1.484 | no | 1.484 | no | 1.485 |
| $\epsilon_{//}$ | 3.18 | $\epsilon_{//}$ | 3.14 | $\epsilon_{//}$ | 3.11 |
| $\epsilon_\perp$ | 5.52 | $\epsilon_\perp$ | 5.53 | $\epsilon_\perp$ | 5.56 |
| $\Delta\epsilon$ | -2.34 | $\Delta\epsilon$ | -2.39 | $\Delta\epsilon$ | -2.46 |
| $\eta$/mPa · s | 18.4 | $\eta$/mPa · s | 18.9 | $\eta$/mPa · s | 20.0 |
| $\gamma_1$/mPa · s | 106 | $\gamma_1$/mPa · s | 108 | $\gamma_1$/mPa · s | 114 |
| $\gamma_1/\Delta n^2 \times 10^{-2}$ | 99 | $\gamma_1/\Delta n^2 \times 10^{-2}$ | 99 | $\gamma_1/\Delta n^2 \times 10^{-2}$ | 99 |
| 3CyCy2 | 20% | 3CyCy2 | 20% | 3CyCy2 | 18% |
| 3CyCy4 | 12% | 3CyCy4 | 12% | 3CyCy4 | 12% |
| 3CyCy5 | 5% | 3CyCy5 | 5% | 3CyCy5 | 5% |
| 3CyPhO1 | 5% | 3CyPhO1 | 2% | 2CyPh5O2 | 7% |
| 2CyPh5O2 | 7% | 2CyPh5O2 | 7% | 3CyPh5O4 | 8% |
| 3CyPh5O4 | 8% | 3CyPh5O4 | 8% | 2CyPhPh5O2 | 6% |
| 2CyPhPh5O2 | 6% | 2CyPhPh5O2 | 6% | 3CyPhPh5O2 | 6% |
| 3CyPhPh5O2 | 6% | 3CyPhPh5O2 | 6% | 3CyCyPh5O3 | 4% |
| 3CyCyPh5O3 | 4% | 3CyCyPh5O3 | 4% | 4CyCyPh5O2 | 4% |
| 4CyCyPh5O2 | 4% | 4CyCyPh5O2 | 4% | 5CyCyPh5O2 | 4% |
| 5CyCyPh5O2 | 4% | 5CyCyPh5O2 | 4% | 3PhPh5Ph2 | 7% |
| 3PhPh5Ph2 | 7% | 3PhPh5Ph2 | 7% | 4PhPh5Ph2 | 8% |
| 4PhPh5Ph2 | 8% | 4PhPh5Ph2 | 8% | 3CyCyPh1 | 11% |
| 3CyCyPh1 | 4% | 3CyCyPh1 | 7% | | |

TABLE 69

| | Comparative Example 73 | Comparative Example 74 | Comparative Example 75 | Comparative Example 76 |
|---|---|---|---|---|
| Liquid crystal composition | Comparative liquid crystal composition 19 | Comparative liquid crystal composition 19 | Comparative liquid crystal composition 19 | Comparative liquid crystal composition 19 |
| Color filter | Color filter 1 | Color filter 2 | Color filter 3 | Color filter 4 |
| VHR | 97.9 | 98.1 | 98.3 | 98.3 |
| ID | 172 | 160 | 146 | 148 |
| Image sticking | D | D | D | D |

TABLE 70

| | Comparative Example 77 | Comparative Example 78 | Comparative Example 79 | Comparative Example 80 |
|---|---|---|---|---|
| Liquid crystal composition | Comparative liquid crystal composition 20 | Comparative liquid crystal composition 20 | Comparative liquid crystal composition 20 | Comparative liquid crystal composition 20 |
| Color filter | Color filter 1 | Color filter 2 | Color filter 3 | Color filter 4 |
| VHR | 98.0 | 98.3 | 98.4 | 98.4 |
| ID | 167 | 144 | 132 | 137 |
| Image sticking | D | D | C | D |

TABLE 71

| | Comparative Example 81 | Comparative Example 82 | Comparative Example 83 | Comparative Example 84 |
|---|---|---|---|---|
| Liquid crystal composition | Comparative liquid crystal composition 21 | Comparative liquid crystal composition 21 | Comparative liquid crystal composition 21 | Comparative liquid crystal composition 21 |
| Color filter | Color filter 1 | Color filter 2 | Color filter 3 | Color filter 4 |
| VHR | 98.1 | 98.3 | 98.4 | 98.4 |
| ID | 162 | 147 | 132 | 137 |
| Image sticking | D | D | C | D |

In the liquid crystal display devices of Comparative Examples 73 to 84, the VHRs were decreased and the IDs were increased compared with the liquid crystal display devices of the present invention. In the evaluation of image sticking, a residual image was observed, which was at an unacceptable level.

Comparative Examples 85 to 88

A comparative liquid crystal composition listed in Table 72 was sandwiched as in Example 1. Liquid crystal display devices of Comparative Examples 85 to 88 were produced using the color filters 1 to 4 listed in Table 1 and the VHR and ID were measured. The image sticking of the liquid crystal display devices was also evaluated. Table 73 shows the results.

TABLE 72

| Comparative liquid crystal composition 22 | |
|---|---|
| $T_{NI}$/° C. | 86.3 |
| $\Delta n$ | 0.105 |
| no | 1.486 |
| $\epsilon_{//}$ | 3.44 |
| $\epsilon_\perp$ | 6.86 |
| $\Delta\epsilon$ | -3.41 |
| $\eta$/mPa · s | 26.4 |

TABLE 72-continued

| Comparative liquid crystal composition 22 | |
|---|---|
| $\gamma_1$/mPa·s | 149 |
| $\gamma_1/\Delta n^2 \times 10^{-2}$ | 135 |
| 3CyCy2 | 24% |
| 3CyPhO1 | 11% |
| 2CyPh5O2 | 10% |
| 2CyPhPh5O2 | 7% |
| 3CyPhPh5O2 | 9% |
| 3CyCyPh5O3 | 10% |
| 4CyCyPh5O2 | 10% |
| 5CyCyPh5O2 | 10% |
| 3PhPh5Ph2 | 4% |
| 4PhPh5Ph2 | 4% |
| 5PhPh1 | 1% |

TABLE 73

| | Comparative Example 85 | Comparative Example 86 | Comparative Example 87 | Comparative Example 88 |
|---|---|---|---|---|
| Liquid crystal composition | Comparative liquid crystal composition 22 | Comparative liquid crystal composition 22 | Comparative liquid crystal composition 22 | Comparative liquid crystal composition 22 |
| Color filter | Color filter 1 | Color filter 2 | Color filter 3 | Color filter 4 |
| VHR | 97.9 | 98.1 | 98.4 | 98.4 |
| ID | 175 | 156 | 146 | 148 |
| Image sticking | D | D | D | D |

In the liquid crystal display devices of Comparative Examples 85 to 88, the VHRs were decreased and the IDs were increased compared with the liquid crystal display devices of the present invention. In the evaluation of image sticking, a residual image was observed, which was at an unacceptable level.

Comparative Examples 89 to 96

Each of the liquid crystal compositions 1, 2, 8, 13, 14, 19, 20, and 26 was set in the VA cell used in Example 1. Liquid crystal display devices of Comparative Examples 89 to 96 were produced using the comparative color filter 1 listed in Table 1 and the VHR and ID were measured. The image sticking of the liquid crystal display devices was also evaluated. Tables 74 and 75 show the results.

TABLE 74

| | Comparative Example 89 | Comparative Example 90 | Comparative Example 91 | Comparative Example 92 |
|---|---|---|---|---|
| Liquid crystal composition | Liquid crystal composition 1 | Liquid crystal composition 2 | Liquid crystal composition 8 | Liquid crystal composition 13 |
| Color filter | Comparative color filter 1 | Comparative color filter 1 | Comparative color filter 1 | Comparative color filter 1 |
| VHR | 97.8 | 98.0 | 98.1 | 98.2 |
| ID | 185 | 174 | 189 | 177 |
| Image sticking | D | D | D | D |

TABLE 75

| | Comparative Example 93 | Comparative Example 94 | Comparative Example 95 | Comparative Example 96 |
|---|---|---|---|---|
| Liquid crystal composition | Liquid crystal composition 14 | Liquid crystal composition 19 | Liquid crystal composition 20 | Liquid crystal composition 26 |
| Color filter | Comparative color filter 1 | Comparative color filter 1 | Comparative color filter 1 | Comparative color filter 1 |
| VHR | 97.9 | 98.1 | 98.3 | 98.3 |
| ID | 180 | 173 | 169 | 166 |
| Image sticking | D | D | D | D |

In the liquid crystal display devices of Comparative Examples 89 to 96, the VHRs were decreased and the IDs were increased compared with the liquid crystal display devices of the present invention. In the evaluation of image sticking, a residual image was observed, which was at an unacceptable level.

Figure 1:
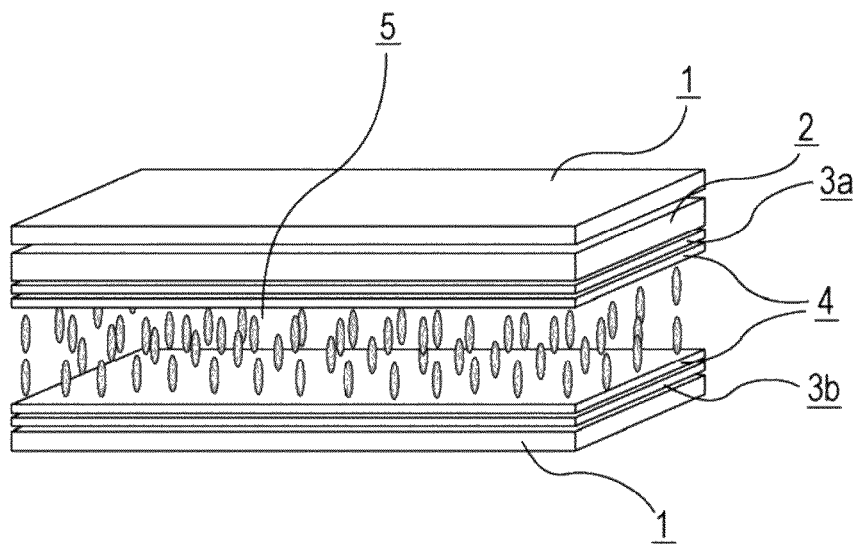
FIG. 1 shows an example of a publicly known typical liquid crystal display device.
Figure 2:
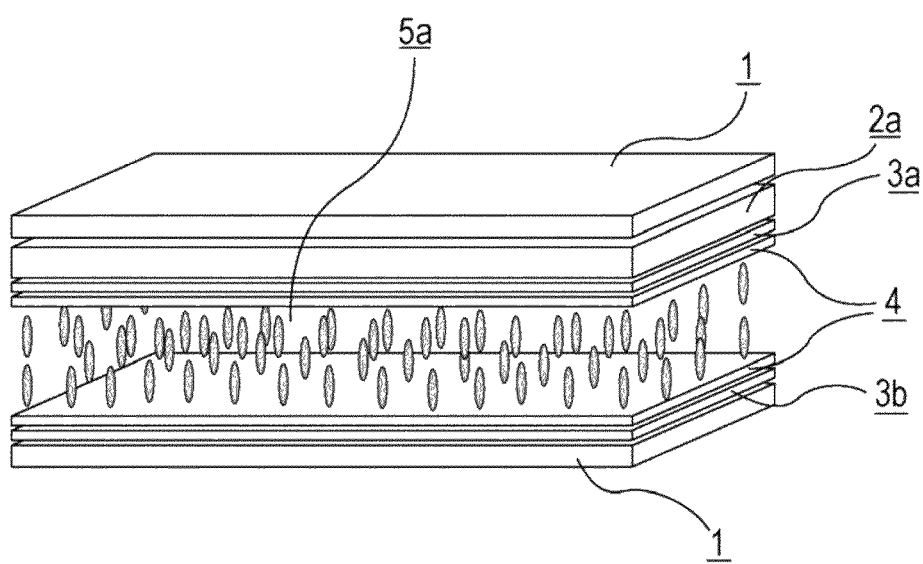
FIG. 2 shows an example of a liquid crystal display device of the present invention.

REFERENCE SIGNS LIST 1 substrate
2 color filter layer
2a color filter layer containing a particular dye and/or pigment
3a transparent electrode layer (common electrode)
3b pixel electrode layer
4 alignment film
5 liquid crystal layer
5a liquid crystal layer containing a particular liquid crystal composition

The invention claimed is:

1. A liquid crystal display device comprising a first substrate, a second substrate, a liquid crystal composition layer sandwiched between the first substrate and the second substrate, a color filter constituted by a black matrix and at least RGB three color pixel portions, a pixel electrode, and a common electrode, wherein the liquid crystal composition layer is composed of a liquid crystal composition containing:

30% to 50% of a compound represented by general formula (I),

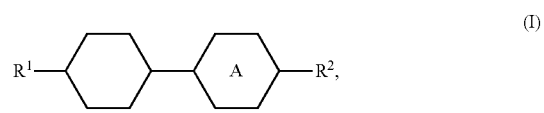

(I)

in the formula (I), $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and A represents a 1,4-phenylene group or a trans-1,4-cyclohexylene group, 5% to 20% of a compound represented by general formula (II-1),

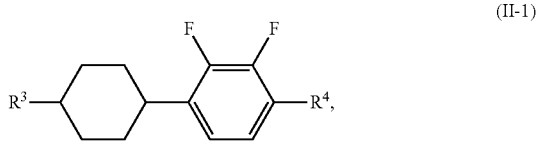
(II-1)

in the formula (II-1), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, 25% to 45% of a compound represented by general formula (II-2),

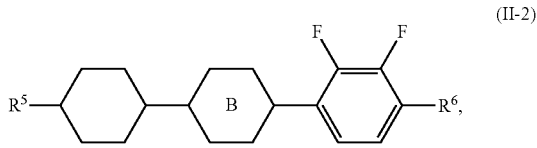
(II-2)

in the formula (II-2), $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; and B represents a 1,4-phenylene group or a trans-1,4-cyclohexylene group that may be substituted with fluorine, and 5% to 20% of a compound represented by general formula (III),

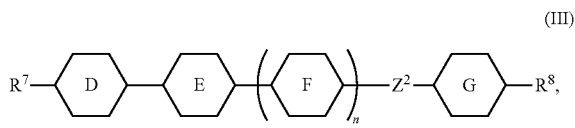
(III)

wherein in the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; D, E, F, and G each independently represent a 1,4-phenylene group or a trans-1,4-cyclohexylene group that may be substituted with fluorine; $Z^2$ represents a single bond, —OCH$_2$—, —OCO—, —CH$_2$O—, or —COO—; and n represents 0 or 1, where if n represents 0, $Z^2$ represents —OCH$_2$—, —OCO—, —CH$_2$O—, or —COO— or D, E, and G represent a 1,4-phenylene group that may be substituted with fluorine, and wherein the RGB three color pixel portions contain, as coloring materials, a diketopyrrolopyrrole pigment and/or an anionic red organic dye in an R pixel portion, a halogenated copper phthalocyanine pigment in a G pixel portion, and an ε-type copper phthalocyanine pigment and/or a cationic blue organic dye in a B pixel portion, a total content of the compounds represented by general formula (I), general formula (II-1), general formula (II-2), and general formula (III) is 90% to 100% of the liquid crystal composition.

2. The liquid crystal display device according to claim 1, wherein the RGB three color pixel portions contain, as coloring materials, C.I. Pigment Red 254 in the R pixel portion, C.I. Pigment Green 7 and/or 36 in the G pixel portion, and C.I. Pigment Blue 15:6 in the B pixel portion.

3. The liquid crystal display device according to claim 1, wherein at least one of organic dyes and pigments selected from the group consisting of C.I. Pigment Red 177, 242, 166, 167, and 179, C.I. Pigment Orange 38 and 71, C.I. Pigment Yellow 150, 215, 185, 138, and 139, C.I. Solvent Red 89, C.I. Solvent Orange 56, and C.I. Solvent Yellow 21, 82, 83:1, 33, and 162 is further contained in the R pixel portion.

4. The liquid crystal display device according to claim 1, wherein at least one of organic dyes and pigments selected from the group consisting of C.I. Pigment Yellow 150, 215, 185, and 138 and C.I. Solvent Yellow 21, 82, 83:1, and 33 is further contained in the G pixel portion.

5. The liquid crystal display device according to claim 1, wherein at least one of organic dyes and pigments selected from the group consisting of C.I. Pigment Blue 1, C.I. Pigment Violet 23, C.I. Basic Blue 7, C.I. Basic Violet 10, C.I. Acid Blue 1, 90, and 83, and C.I. Direct Blue 86 is further contained in the B pixel portion.

6. The liquid crystal display device according to claim 1, wherein the color filter is constituted by the black matrix, the RGB three color pixel portions, and a Y pixel portion; and at least one of yellow organic dyes and pigments selected from the group consisting of C.I. Pigment Yellow 150, 215, 185, 138, and 139 and C.I. Solvent Yellow 21, 82, 83:1, 33, and 162 is contained in the Y pixel portion as a coloring material.

7. The liquid crystal display device according to claim 1, wherein at least one compound represented by general formula (I) with A representing a 1,4-phenylene group and at least one compound represented by general formula (I) with A representing a trans-1,4-cyclohexylene group are contained.

8. The liquid crystal display device according to claim 1, wherein at least one compound represented by general formula (II-2) with B representing a 1,4-phenylene group and at least one compound represented by general formula (II-2) with B representing a trans-1,4-cyclohexylene group are contained.

9. The liquid crystal display device according to claim 1, wherein the content of the compounds represented by general formula (II-1), general formula (II-2), and general formula (III) is 35% to 70%.

10. The liquid crystal display device according to claim 1, wherein Z of the liquid crystal composition constituting the liquid crystal composition layer is 13000 or less, Z being represented by formula below, $$Z=\gamma 1/\Delta n^2$$

(in the formula, γ1 represents rotational viscosity and Δn represents refractive index anisotropy), γ1 is 150 or less, and Δn is 0.08 to 0.13.

11. The liquid crystal display device according to claim 1, wherein the liquid crystal composition constituting the liquid crystal composition layer has a nematic liquid crystal phase upper limit temperature of 60° C. to 120° C. and a nematic liquid crystal phase lower limit temperature of −20° C. or less, and a difference between the nematic liquid crystal phase upper limit temperature and the nematic liquid crystal phase lower limit temperature is 100 to 150.

12. The liquid crystal display device according to claim 1, wherein the liquid crystal composition constituting the liquid crystal composition layer has a specific resistance of $10^{12}$ (Ω·m) or more.

13. The liquid crystal display device according to claim 1, wherein the liquid crystal composition layer contains a polymer obtained by polymerizing a liquid crystal composition containing a polymerizable compound represented by general formula (V)

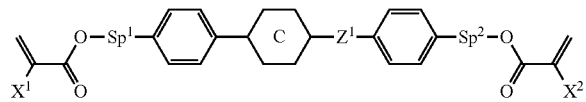
(V)

in the formula (V), $X^1$ and $X^2$ each independently represent a hydrogen atom or a methyl group;

Sp$^1$ and Sp$^2$ each independently represent a single bond, an alkylene group having 1 to 8 carbon atoms, or —O—(CH$_2$)$_s$— wherein s represents an integer of 2 to 7 and the oxygen atom bonds to an aromatic ring; $Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— wherein Y$^1$ and Y$^2$ each independently represent a fluorine atom or a hydrogen atom, —C≡C—, or a single bond; and C represents a 1,4-phenylene group, a trans-1,4-cyclohexylene group, or a single bond and, in all the 1,4-phenylene groups in the formula, any of hydrogen atoms may be substituted with a fluorine atom.

14. The liquid crystal display device according to claim 13, wherein, in general formula (V), C represents a single bond and $Z^1$ represents a single bond.

15. The liquid crystal display device according to claim 1, wherein the liquid crystal composition layer is disposed between the pixel electrode and the common electrode, wherein the color filter is disposed between the first substrate and the common electrode.

* * * * *